US011905735B2

(12) United States Patent
Solanki et al.

(10) Patent No.: US 11,905,735 B2

(45) Date of Patent: Feb. 20, 2024

(54) KEY-OPERABLE LOCKSET

(71) Applicant: Schlage Lock Company LLC, Carmel, IN (US)

(72) Inventors: Snehil Solanki, Colorado Springs, CO (US); Kenton H. Barker, Colorado Springs, CO (US); James D. Ohl, Colorado Springs, CO (US); Greg Hebner, Colorado Springs, CO (US); David J. Hurlbert, Manitou Springs, CO (US)

(73) Assignee: Schlage Lock Company LLC, Carmel, IN (US)

( * ) Notice: Subject to any disclaimer, the term of this patent is extended or adjusted under 35 U.S.C. 154(b) by 675 days.

(21) Appl. No.: 17/073,782

(22) Filed: Oct. 19, 2020

(65) Prior Publication Data

US 2022/0120116 A1 Apr. 21, 2022

(51) Int. Cl.
*E05B 13/00* (2006.01)
*E05B 27/00* (2006.01)

(52) U.S. Cl.
CPC ................................ *E05B 27/0003* (2013.01)

(58) Field of Classification Search
CPC ........ E05B 27/0003; E05B 9/08; E05B 9/084; E05B 13/00; E05B 13/10; E05B 13/002;
(Continued)

(56) References Cited

U.S. PATENT DOCUMENTS 2,263,713 A * 11/1941 Adam ..................... E05B 55/00 70/378
2,814,195 A * 11/1957 Ahlquist ............... E05B 55/005 70/216

(Continued)

FOREIGN PATENT DOCUMENTS

CN 1380928 A * 11/2002 ........... E05B 13/002
CN 1380929 A * 11/2002 ........... E05B 13/002

OTHER PUBLICATIONS

American National Standard for Bored and Preassembled Locks and Latches; BHMA; Builders Hardware Manufacturers Association, Inc.; American National Standards Institute, Inc.; Oct. 15, 2003; 31 pages.

(Continued)

*Primary Examiner* — Suzanne L Barrett
(74) *Attorney, Agent, or Firm* — Taft Stettinius & Hollister LLP

(57) ABSTRACT

A lockset including a chassis having a locked state and an unlocked state, a latchbolt connected with the chassis, a handle mounted to the chassis, and a lock cylinder connected with the chassis. The handle is operable to retract the latchbolt when the chassis is unlocked, and is inoperable to retract the latchbolt when the chassis is locked. The lock cylinder includes a shell and a plug selectively rotatable relative to the shell. The chassis is configured to transition from the locked state to the unlocked state in response to rotation of the plug in a first rotational direction from a home position to a first rotated position. The chassis is configured to return from the unlocked state to the locked state in response to rotation of the plug in a second rotational direction from the first rotated position to the home position.

22 Claims, 13 Drawing Sheets

(58) Field of Classification Search
CPC ........ E05B 55/00; E05B 11/02; E05B 55/005; E05Y 2900/132; Y10T 70/5221
USPC .......................................................... 70/106
See application file for complete search history.

(56) References Cited

U.S. PATENT DOCUMENTS

| | | | | |
|---|---|---|---|---|
| 3,016,730 A * | 1/1962 | Dey, Sr. | E05B 55/00 70/150 |
| 3,157,041 A * | 11/1964 | Fryer | E05B 55/005 70/216 |
| 3,999,411 A * | 12/1976 | Kambic | E05B 55/00 70/144 |
| 4,951,486 A * | 8/1990 | Braun | E05C 9/046 292/DIG. 31 |
| 5,694,798 A | 12/1997 | Nunez et al. | |
| 5,916,281 A | 6/1999 | Kester et al. | |
| 6,189,351 B1 | 2/2001 | Eagan et al. | |
| 8,267,442 B2 | 9/2012 | Tien et al. | |
| 8,844,330 B2 | 9/2014 | Moon et al. | |
| 9,404,284 B2 | 8/2016 | Stendal | |
| 2002/0100301 A1 | 8/2002 | Eller et al. | |
| 2002/0152781 A1 | 10/2002 | Teskey | |
| 2009/0169299 A1 | 7/2009 | Dutilleul | |
| 2016/0340931 A1 | 11/2016 | Huang et al. | |
| 2019/0136575 A1 | 5/2019 | Barker et al. | |
| 2019/0136581 A1 | 5/2019 | Barker et al. | |

OTHER PUBLICATIONS

International Search Report; International Searching Authority; International Patent Application No. PCT/US2021/055595; dated Mar. 7, 2022; 2 pages.

Written Opinion of the International Searching Authority; International Searching Authority; International Patent Application No. PCT/US2021/055595; dated Mar. 7, 2022; 6 pages.

* cited by examiner

KEY-OPERABLE LOCKSET

TECHNICAL FIELD

The present disclosure generally relates to locksets, and more particularly but not exclusively relates to cylindrical locksets.

BACKGROUND

In the access control industry, there are a number of standard functions that exist for locksets, including passage, privacy, office, storeroom, and others. Each function is characterized by a particular combination of features, including those related to whether the outside handle is locked stationary or freewheeling, the manner in which the lockset is locked and unlocked (e.g., via pushbutton, turnbutton, lock cylinder), whether the latchbolt mechanism has a deadlocking functionality, and other characteristics. One such function is the storeroom function, in which the outside handle is always locked, and a key is required to operate the lockset from the outside. In such existing storeroom functions, the key is inserted into a lock cylinder of the lockset and rotated to thereby retract the latchbolt. However, two hands are often required to open the door—one to rotate the key for retraction of the latchbolt and the other to pull or push the door open using the lever. Such two-handed operation can be difficult for certain users, particularly when there is a door closer installed to the door. For these reasons among others, there remains a need for further improvements in this technological field.

SUMMARY

An exemplary lockset includes a chassis having a locked state and an unlocked state, a latchbolt connected with the chassis, a handle rotatably mounted to the chassis, and a lock cylinder connected with the chassis. The handle is operable to retract the latchbolt when the chassis is unlocked, and is inoperable to retract the latchbolt when the chassis is locked. The lock cylinder includes a shell and a plug selectively rotatable relative to the shell. The chassis is configured to transition from the locked state to the unlocked state in response to rotation of the plug in a first rotational direction from a home position to a first rotated position. The chassis is configured to return from the unlocked state to the locked state in response to rotation of the plug in a second rotational direction from the first rotated position to the home position. Further embodiments, forms, features, and aspects of the present application shall become apparent from the description and figures provided herewith.

DETAILED DESCRIPTION OF ILLUSTRATIVE EMBODIMENTS

Figure 1:
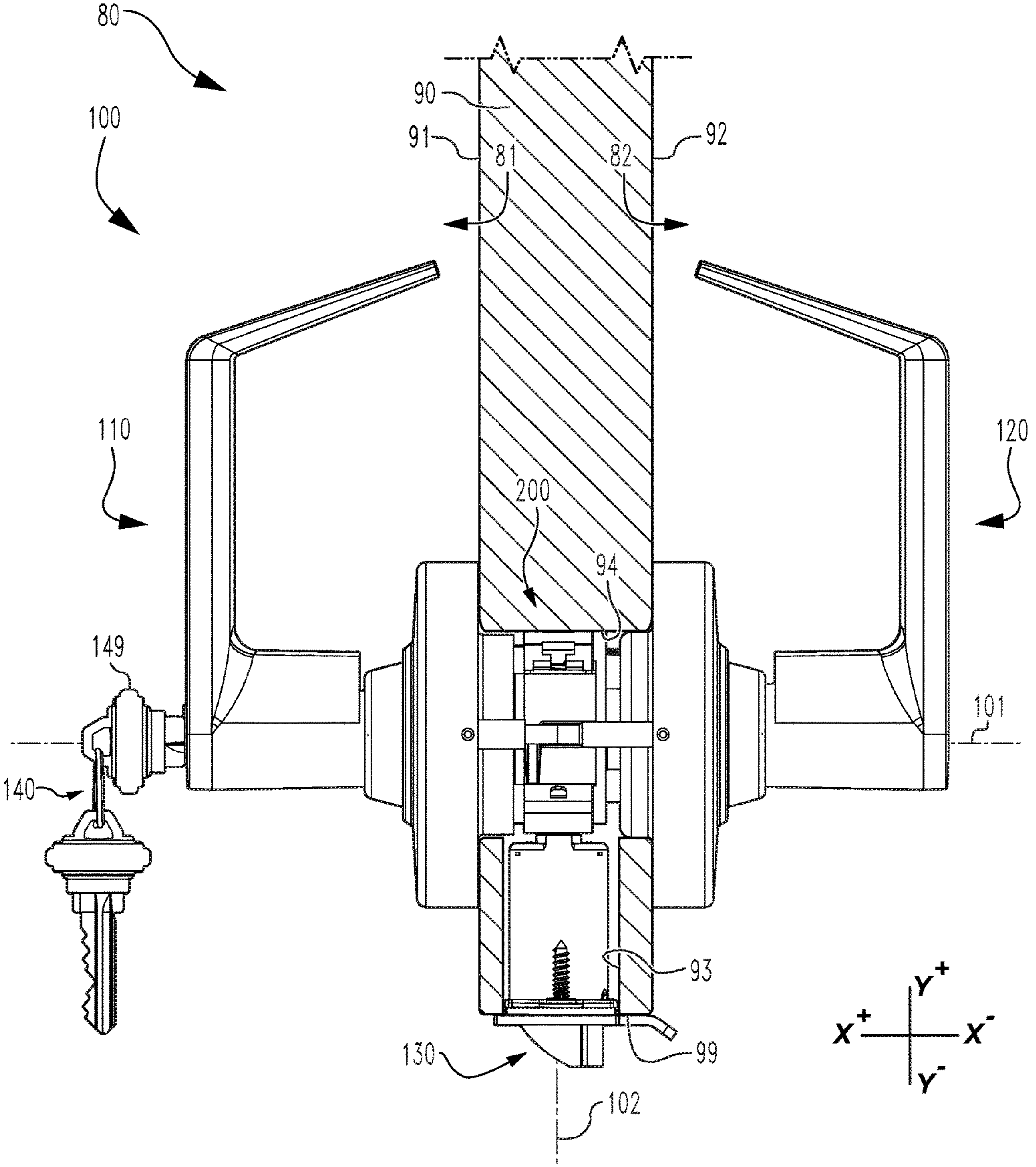
FIG. 1 is a plan view of a closure assembly according to certain embodiments, which includes a door and a lockset according to certain embodiments installed to the door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIGS. 1 and 2, the X-axis defines first and second longitudinal directions, the Y-axis defines first and second lateral directions, and the Z-axis defines first and second transverse directions. More particularly, the longitudinal X-axis defines a proximal direction $X^+$ (to the left in FIG. 1) and an opposite distal direction $X^-$ (to the right in FIG. 1), the lateral Y-axis defines a laterally inward direction $Y^+$ (upward in FIG. 1) and an opposite laterally outward direction $Y^-$ (downward in FIG. 1). Additionally, the Z-axis defines a first transverse direction $Z^+$ (upward in FIG. 2) and a second transverse direction $Z^-$ (downward in FIG. 2). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a closure assembly 80 including a door 90 and a lockset 100 according to certain embodiments. The closure assembly 80 defines a boundary between an outside or non-egress region 81 and an inside or egress region 82, and passage between the outside region 81 and the inside region 82 is permitted when the door 90 is in its open position. The door 90 includes an outer side 91 facing the outside region 81 when the door 90 is in its closed position, an inner side 92 opposite the outer side 91 and facing the inside region 82 when the door 90 is in its closed position, a latch bore 93 extending laterally inward from a free edge 99 of the door 90, and a cross-bore 94 extending longitudinally between the outer side 91 and the inner side 92 and intersecting the latch bore 93.

The lockset assembly 100 has a longitudinal axis 101 and a lateral axis 102, and generally includes an outside assembly 110 mounted to the outer side 91 of the door 90, an inside assembly 120 mounted to the inner side 92 of the door 90, a latchbolt mechanism 130 mounted in the latch bore 93, and a chassis 200 that is mounted in the cross-bore 94 and which is engaged with each of the outside assembly 110, the inside assembly 120, and the latchbolt mechanism 130. As described herein, in the illustrated form, the inside assembly 120 is always operable to actuate the latchbolt mechanism 130 for free egress from the inside region 82, and the outside assembly 110 is operable to actuate the latchbolt mechanism 130 for entry to the inside region 82 only when the user possesses a proper key 149.

Figure 2:
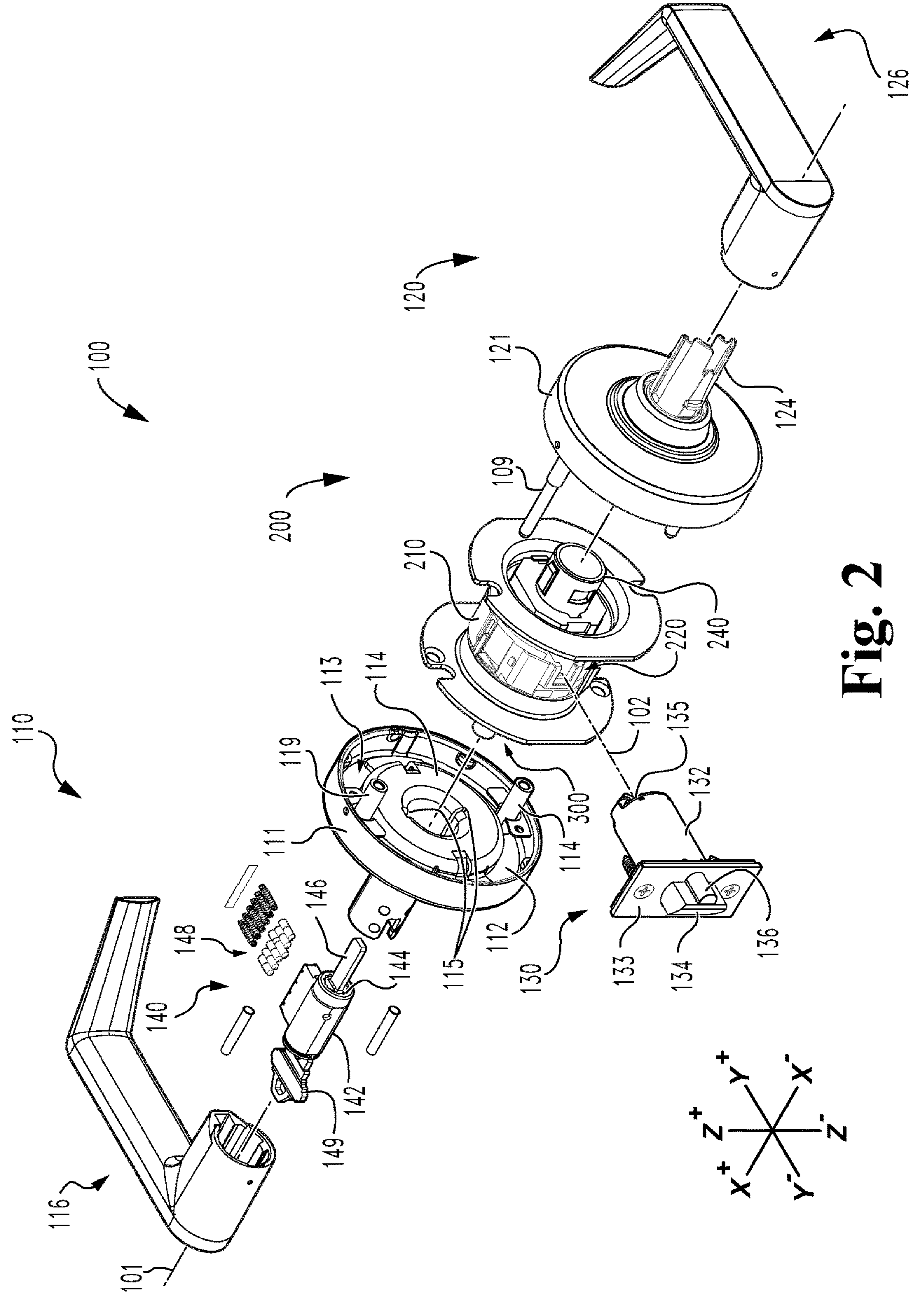
FIG. 2 is a first exploded assembly view of the lockset illustrated in FIG. 1.
Figure 3:
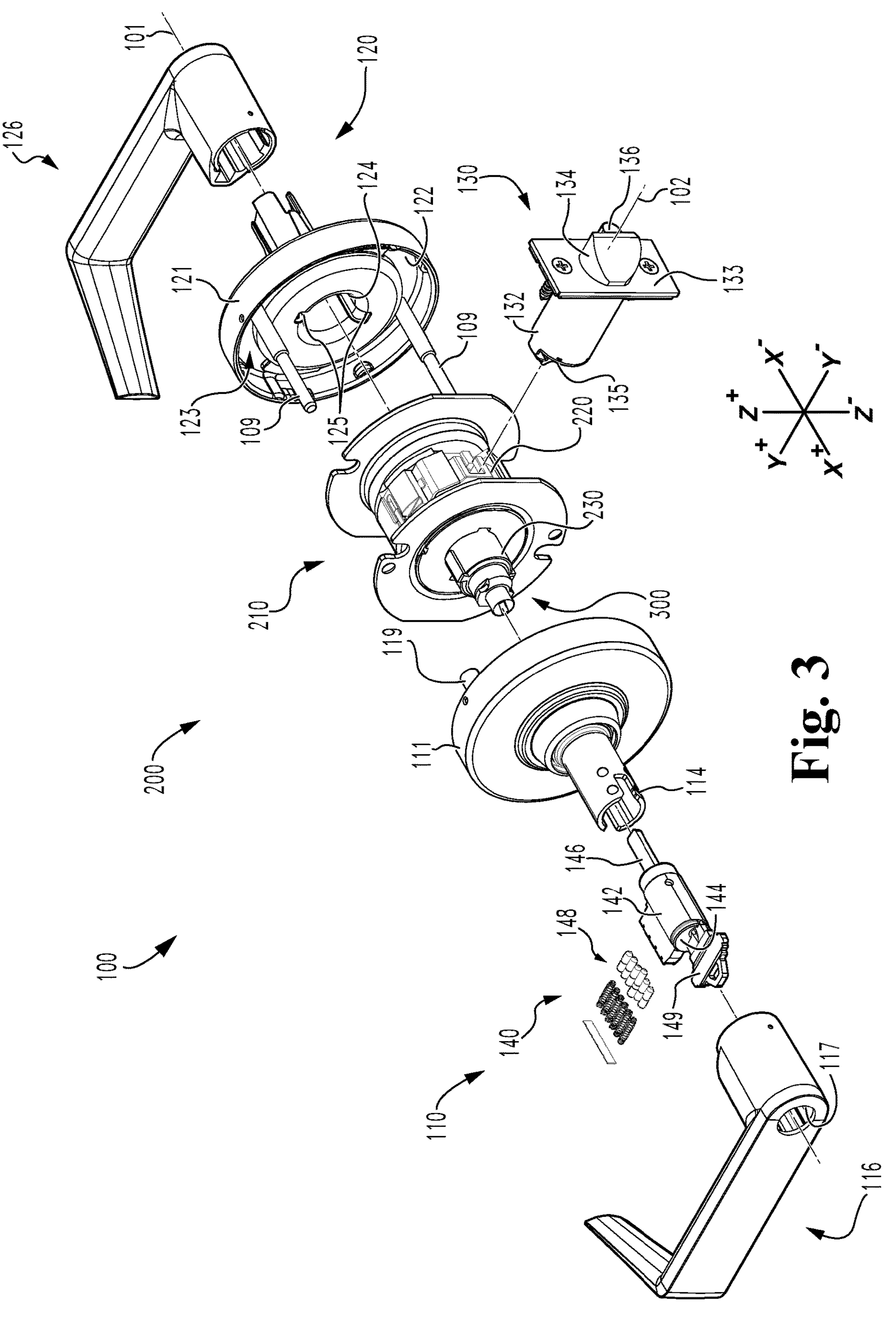
FIG. 3 is a second exploded assembly view of the lockset illustrated in FIG. 1.

With additional reference to FIGS. 2 and 3, the outside assembly 110 generally includes an outside spring cage 112, an outside spindle 114 rotatably mounted to the outside spring cage 112, an outside handle 116 secured to the outside spindle 114, and a lock cylinder 140 mounted in the outside spindle 114 and the outside handle 116, and may further include an outside rose 111 covering the outside spring cage 112. The outside spring cage 112 abuts the outer side 91 of the door 90, and includes a rotational bias mechanism 113 that biases the outside spindle 114 to a home position. The rotational bias mechanism 113 may, for example, comprise one or more of a compression spring, a torsion spring, a tension spring, an elastic member, and/or a magnetic bias mechanism. The outside spindle 114 is biased to its home position by the spring cage 112, and is selectively operable to rotate to a rotated position, for example upon rotation of the outside handle 116. The outside spindle 114 may include one or more features that facilitate rotational coupling of the spindle 114 with an outside drive tube 230 of the chassis 200, such as a pair of longitudinal slots 115. The outside handle 116 is mounted to the outside spindle 114 for joint rotation therewith, and is selectively operable to rotate the outside spindle 114 as described herein. While the illustrated handle 116 is provided in the form of a lever handle, it is also contemplated that the outside handle 116 may be provided in the form of a knob handle.

The inside assembly 120 generally includes an inside spring cage 122, an inside spindle 124 rotatably mounted to the inside spring cage 122, and an inside handle 126 secured to the inside spindle 124, and may further include an inside rose 121 covering the inside spring cage 122. The inside spring cage 122 abuts the inner side 92 of the door 90, and includes a rotational bias mechanism 123 that biases the inside spindle 124 to a home position. The rotational bias mechanism 123 may, for example, comprise one or more of a compression spring, a torsion spring, a tension spring, an elastic member, and/or a magnetic bias mechanism. The inside spindle 124 is biased to its home position by the spring cage 122, and is operable to rotate to a rotated position, for example upon rotation of the inside handle 126. The inside spindle 124 may include one or more features that facilitate rotational coupling of the spindle 124 with an inside drive tube 240 of the chassis 200, such as a pair of longitudinal slots 125. The inside handle 126 is mounted to the inside spindle 124 for joint rotation therewith, and is operable to rotate the inside spindle 124 to thereby rotate the inside drive tube 240. While the illustrated handle 126 is provided in the form of a lever handle, it is also contemplated that the inside handle 126 may be provided in the form of a knob handle.

The outside assembly 110 and the inside assembly 120 may include features that facilitate assembly of the lockset 100 during installation of the lockset 100 to the door 90. In the illustrated form, the outside assembly 110 includes a pair of posts 119 that receive fasteners such as bolts 109, which may be inserted through the housing of the inside spring cage 122 for coupling of the outside assembly 110 with the inside assembly 120. The bolts 109 may, for example, pass through a pair of apertures formed above and below the cross-bore 94 to rotationally couple the lockset 100 with the door 90. It is also contemplated that the inside assembly 120 may include a pair of posts, and the bolts 109 may be inserted through the housing of the outside spring cage 112 for coupling of the outside assembly 110 with the inside assembly 120. As will be appreciated, the openings formed in the outside spring cage 112 and/or the inside spring cage 122 may be covered by the corresponding rose 111/121 such that the heads of the bolts 109 are neither visible nor accessible to the user when the lockset 100 is installed to the door 90.

The latchbolt mechanism 130 is mounted in the latch bore 93, and generally includes a housing 132 and a latchbolt 134 slidably mounted in the housing 132 for lateral movement between an extended position and a retracted position. The latchbolt mechanism 130 may further include an auxiliary bolt 136 slidably mounted in the housing 132 for lateral movement between a projected position and a depressed position. The housing 132 includes a faceplate 133 beyond which the latchbolt 134 projects when in the extended position. The latchbolt 134 includes a bolt bar 135 by which the latchbolt 134 is coupled with a shuttle 220 of the chassis 200 for retraction of the latchbolt 134 as described herein. The auxiliary bolt 136 may constitute a portion of a deadlocking mechanism that prevents externally-applied pushing forces (e.g., pushing forces applied to the nose of the latchbolt 134) from driving the latchbolt 134 to its retracted position while the auxiliary bolt 136 is in its depressed position, as would be the case when the door 90 is in its closed position. It is also contemplated that the latchbolt mechanism 130 may not necessarily include deadlocking functionality.

Figure 4:
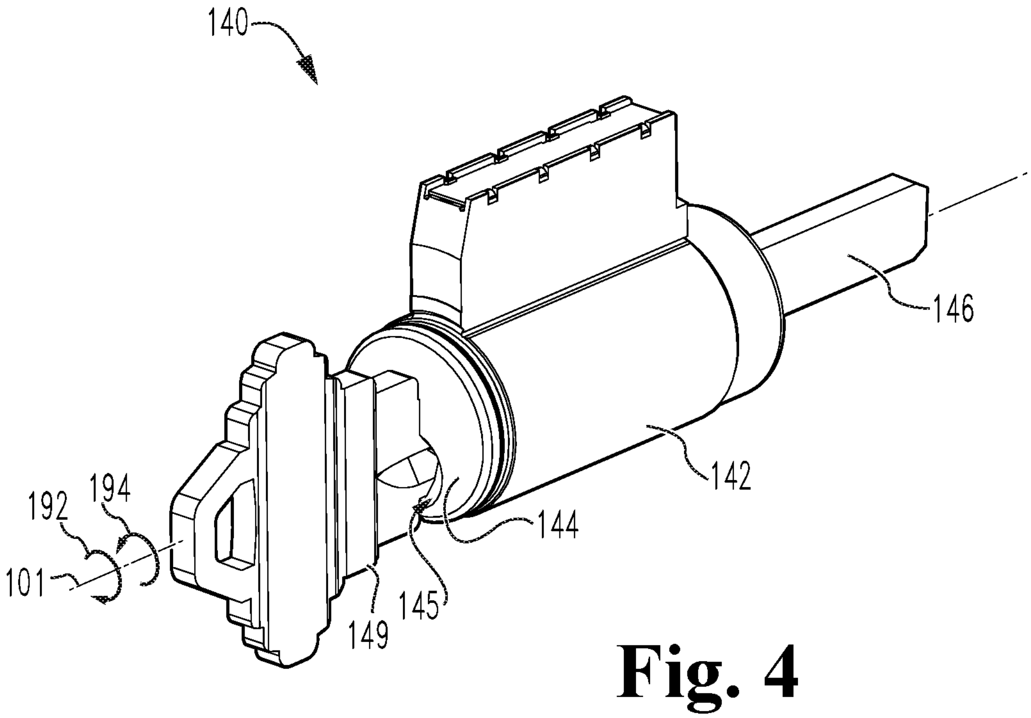
FIG. 4 is a perspective view of a lock cylinder in which a plug of the lock cylinder is in a home position.
Figure 5:
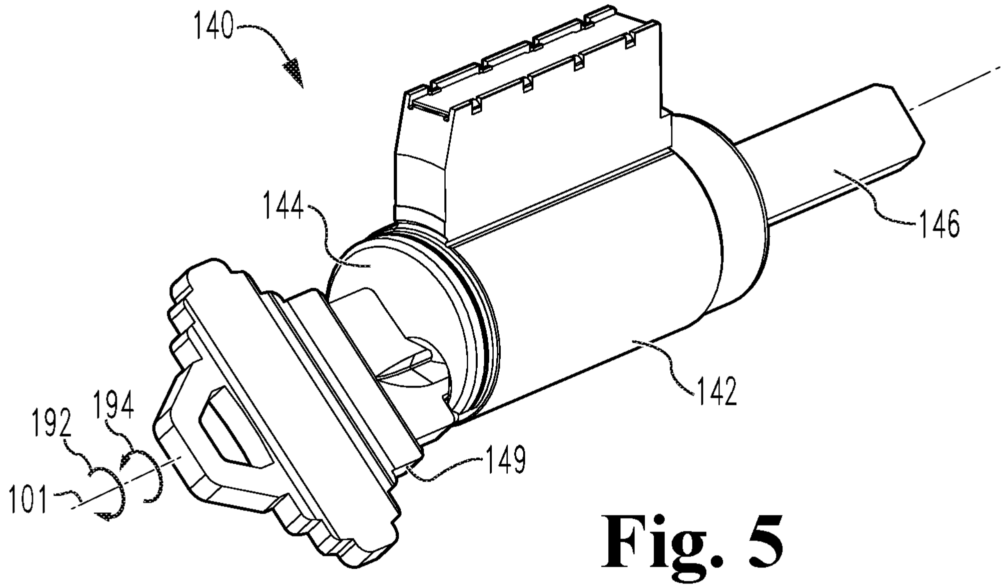
FIG. 5 is a perspective view of the lock cylinder in which the plug of the lock cylinder is in a first rotated position.

With additional reference to FIGS. 4 and 5, the lock cylinder 140 is operable by a corresponding proper key 149, and generally includes a shell 142, a plug 144 rotatably mounted in the shell 142, a tailpiece 146 rotationally coupled with the plug 144, and a tumbler assembly 148 configured to selectively prevent rotation of the plug 144 relative to the shell 142. The lock cylinder 140 is mounted in the outside spindle 114 and the outside handle 116, the shell 142 is rotationally coupled with the outside spindle 114 and the outside handle 116, and the plug 144 is accessible via an opening 117 in the outside handle 116 to permit insertion of the key 149 into a keyway 145 of the plug 144. Upon insertion of the proper key 149 into the keyway 145, the tumbler assembly 148 moves from a blocking state to an unblocking state to permit rotation of the plug 144 relative to the shell 142.

Upon insertion of the proper key 149, the plug 144 is operable to rotate from a home position (FIG. 4) in a first rotational direction 192 (clockwise in FIGS. 4 and 5) to a first rotated position (FIG. 5), and is operable to rotate from the first rotated position (FIG. 5) to the home position (FIG. 4) in a second rotational direction 194 (counter-clockwise in FIGS. 4 and 5). In certain embodiments, the plug 144 may further be rotatable from the home position in the second rotational direction 194, while in other embodiments, such rotation of the plug 144 from the home position in the second rotational direction 194 may be prevented by chassis 200 as described herein. As is typical of lock cylinders, the tumbler assembly 148 prevents removal of the key 149 until the plug 144 is returned to its home position. While the illustrated tumbler assembly 148 is provided in the form of a pin tumbler assembly, it is also contemplated that the tumbler assembly 148 may include additional or alternative forms of tumblers, such as disk tumblers, wafer tumblers, finger pins, or another form of tumbler. Lock cylinders of this type are known in the art, and need not be described in further detail herein.

Figure 6:
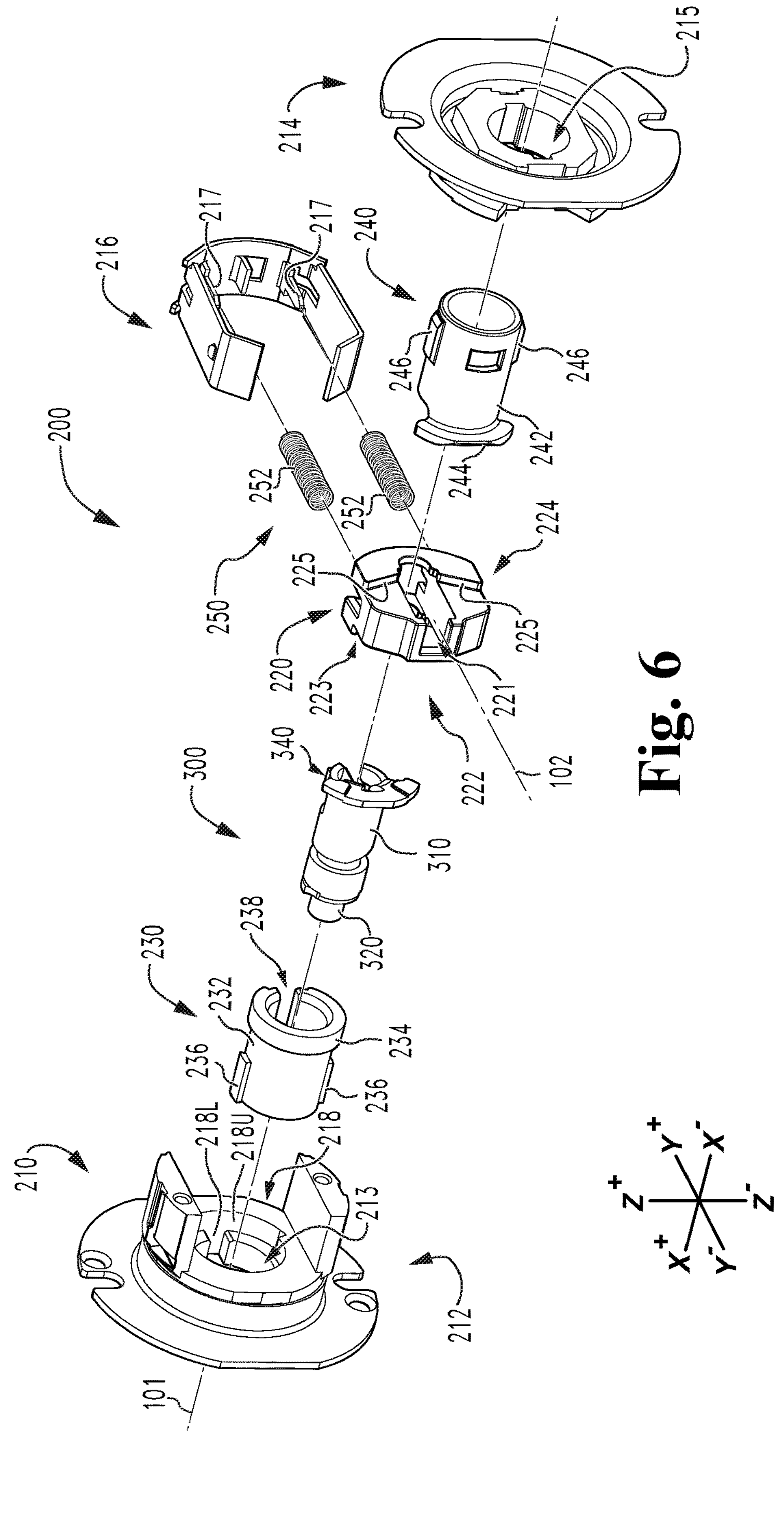
FIG. 6 is a first exploded assembly view of a chassis of the lockset illustrated in FIG. 1.
Figure 7:
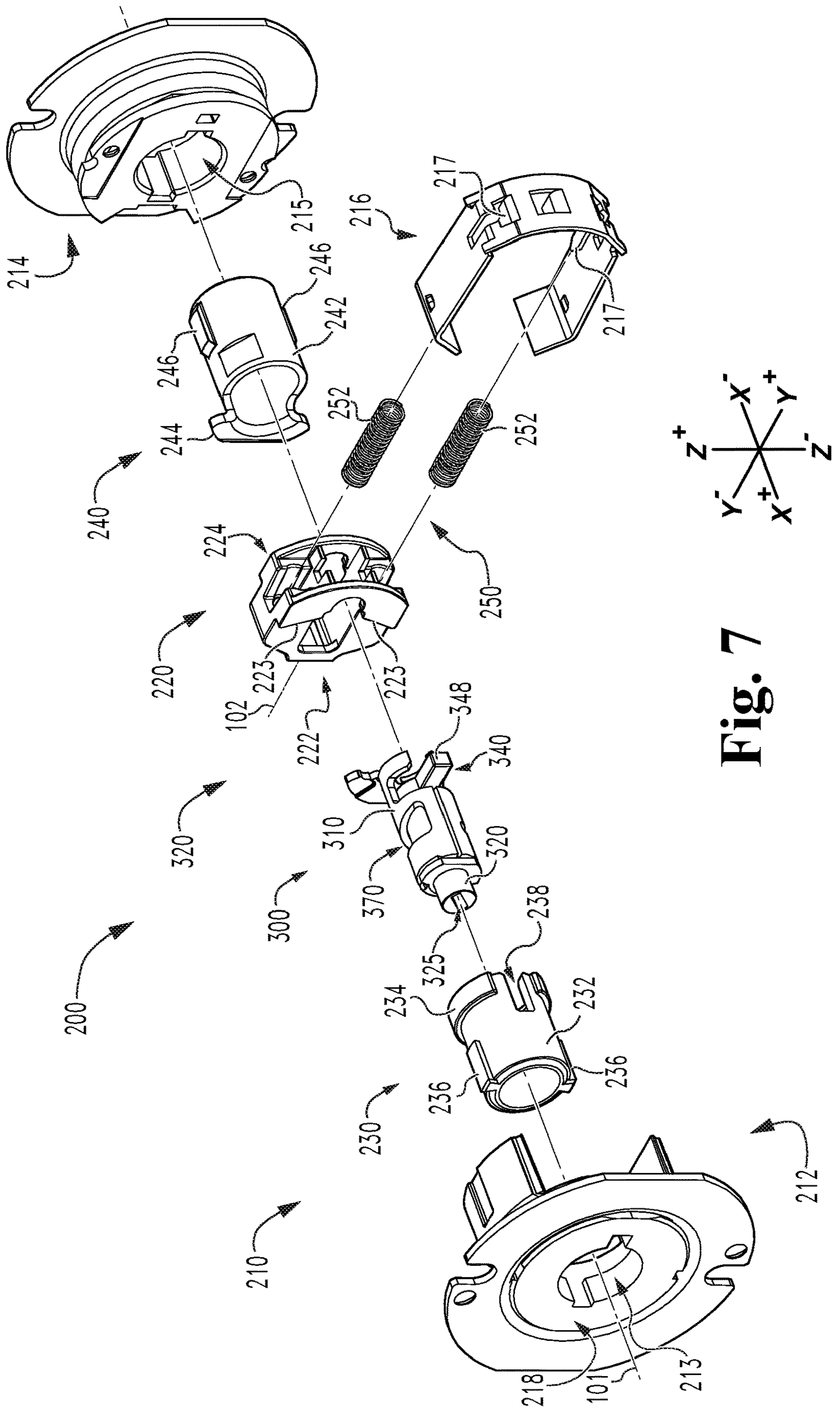
FIG. 7 is a second exploded assembly view of the chassis illustrated in FIG. 6.

With additional reference to FIGS. 6 and 7, the chassis 200 generally includes a housing 210, a shuttle 220 slidably mounted in the housing 210 for lateral movement between a home position and a retracting position, an outside drive tube 230 rotatably mounted to the housing 210 on an outer side of the chassis 200, an inside drive tube 240 rotatably mounted to the housing 210 on an inner side of the chassis 200, a bias mechanism 250 urging the shuttle 220 toward its extending position, and a keycam assembly 300 according to certain embodiments mounted in the outside drive tube 230 and engaged with the shuttle 220. While the illustrated chassis 200 includes the keycam assembly 300 illustrated in FIGS. 8-11, it is also contemplated that the chassis 200 may include the keycam assembly 400 illustrated in FIG. 12 or the keycam assembly 500 illustrated in FIGS. 13-16.

The housing 210 generally includes an outside hub 212 defining a proximal portion of the housing 210, an inside hub 214 defining a distal portion of the housing 210, and a bracket 216 forming a central portion of the housing 210. The outside hub 212 includes a generally circular aperture 213 in which the outside drive tube 230 is rotatably seated, and a lock/unlock recess 218 is formed adjacent the generally circular aperture 213. As described herein, the lock/unlock recess 218 is operable to receive an arm 348 of a lock control lug 340 of the keycam assembly 300. The recess 218 includes an unlocking section 218U in the form of an arcuate recess and a locking section 218L in the form of a longitudinal slot. As described in further detail below, the unlocking section 218U receives the arm 348 when the lockset 100 is in its unlocked state, and the locking section 218L receives the arm 348 when the lockset 100 is in its locked state. The inside hub 214 is coupled with the outside hub 212, and includes a generally circular aperture 215 in which the inside drive tube 240 is rotatably seated. The bracket 216 is engaged with the outside hub 212 and/or the inside hub 214 and has a fixed lateral position within the housing 210. In the illustrated form, the bracket 216 includes a pair of posts 217 by which the bias mechanism 250 is mounted to the housing 210.

The shuttle 220 is slidably mounted in the housing 210 for lateral movement between a laterally outward home position and a laterally inward retracting position, and is biased toward the home position by the bias mechanism 250. The shuttle 220 includes an engagement slot 221 operable to receive an end portion of the bolt bar 135 such that retraction of the shuttle 220 causes a corresponding retraction of the latchbolt 134. The shuttle 220 also includes a proximal outside face 222 and an opposite distal inside face 224. The outside face 222 includes a pair of outside ramps 223, and the inside face 224 includes a pair of inside ramps 225. As described herein, each set of ramps 223, 225 is configured to be engaged by a corresponding rotatable member such that rotation of the rotatable member from its home position laterally drives the shuttle 220 from its home position toward its retracting position to thereby actuate the latchbolt mechanism 130.

The outside drive tube 230 includes a tubular body portion 232, a distal collar 234 formed on a distal end of the body portion 232, a pair of proximal splines 236 extending radially outward from the body portion 232, and a distal slot 238 extending proximally from a distal end of the drive tube 230. The tubular body portion 232 is seated in the generally circular aperture 213 of the outside hub 212 such that the outside drive tube 230 is rotatably supported by the outside hub 212, and the collar 234 engages the outside hub 212 to retain the drive tube 230 within the housing 210. When assembled to the outside assembly 110, the splines 236 are received in the longitudinal slots 115 of the outside spindle 114 such that the outside drive tube 230 is rotationally coupled with the outside spindle 114, and thus with the outside handle 116 that is secured to the outside spindle 114. As a result, the outside drive tube 230 is biased toward its home position by the rotational bias mechanism 113 of the outside spring cage 112, and rotation of the outside handle 116 from its home position will cause a corresponding rotation of the outside drive tube 230 from its home position.

The inside drive tube 240 includes a tubular body portion 242, an ear 244 formed at a proximal end of the body portion 242, and a pair of distal splines 246 extending radially outward from the body portion 242. The tubular body portion 242 is seated in the generally circular aperture 215 of the inside hub 214 such that the inside drive tube 240 is rotatably supported by the inside hub 214, and the ear 244 engages the proximal side of the inside hub 214 to retain the drive tube 240 within the housing 210. When assembled to the outside assembly 110, the splines 246 are received in the longitudinal slots 125 of the inside spindle 124 such that the inside drive tube 240 is rotationally coupled with the inside spindle 124, and thus with the inside handle 126 that is secured to the inside spindle 124. As a result, the inside drive tube 240 is biased toward its home position by the rotational bias mechanism 123 of the inside spring cage 122, and rotation of the inside handle 126 from its home position will cause a corresponding rotation of the inside drive tube 240 from its home position. The ear 244 is engaged with the inside face 224 of the shuttle 220 such that rotation of the drive tube 240 in either direction causes a corresponding edge of the ear 244 to engage a corresponding one of the ramps 225 to drive the shuttle 220 towards its retracting position for actuation of the latchbolt mechanism 130. As a result, the inside handle 126 is always operable to retract the latchbolt 134 such that the lockset 100 provides a free egress function.

The bias mechanism 250 is engaged between the housing 210 and the shuttle 220, and biases the shuttle 220 laterally outward and toward its home position. In the illustrated form, the bias mechanism 250 includes a pair of compression springs 252, each of which is mounted to a corresponding one of the posts 217 of the bracket 216. It is also contemplated that the bias mechanism 250 may include other forms of biasing members to bias the shuttle 220 toward its home position, such as one or more of a torsion spring, an extension spring, a leaf spring, an elastic member, or magnets.

Figure 8:
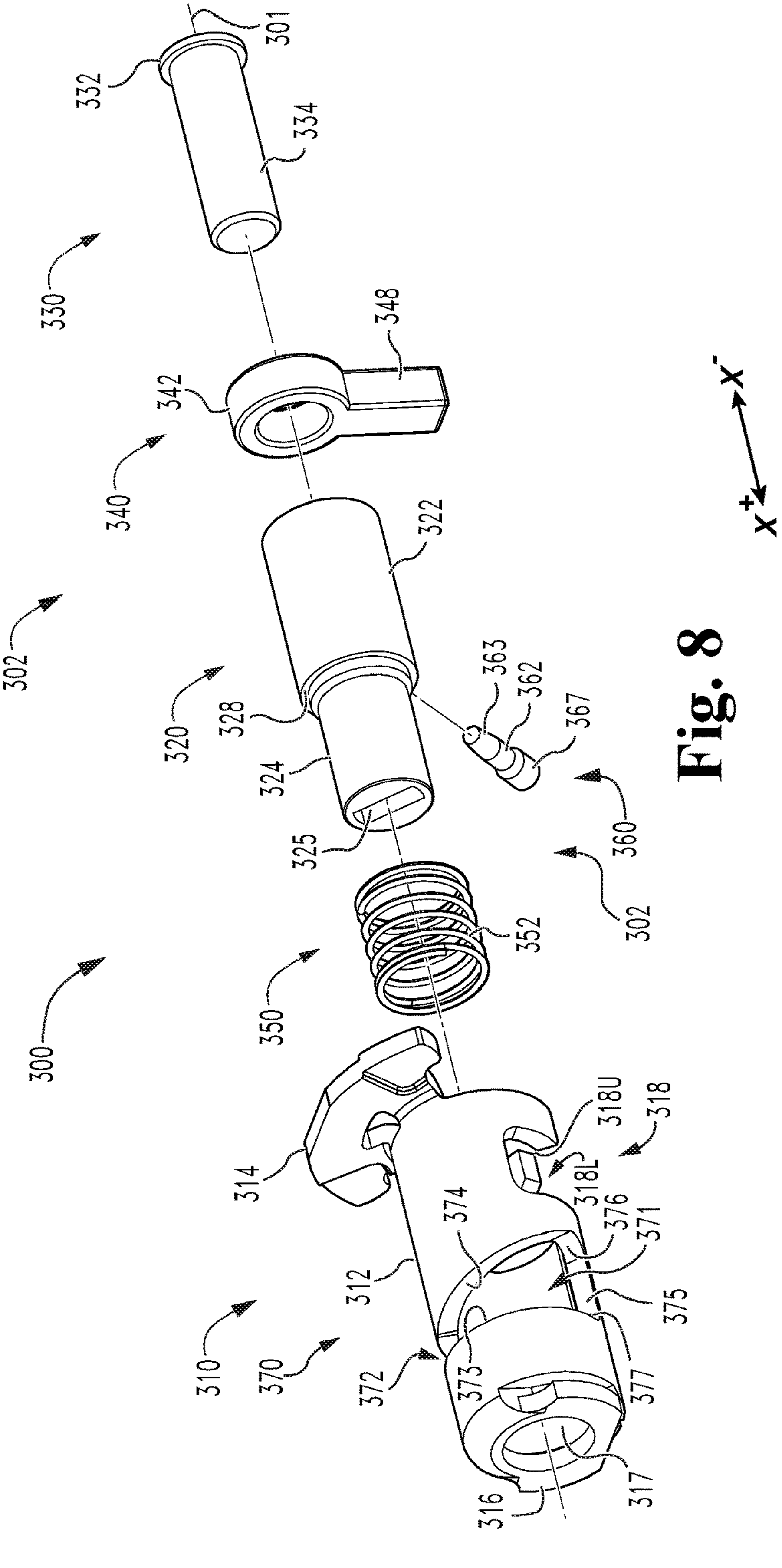
FIG. 8 is a first exploded assembly view of a keycam assembly of the lockset illustrated in FIG. 1.
Figure 9:
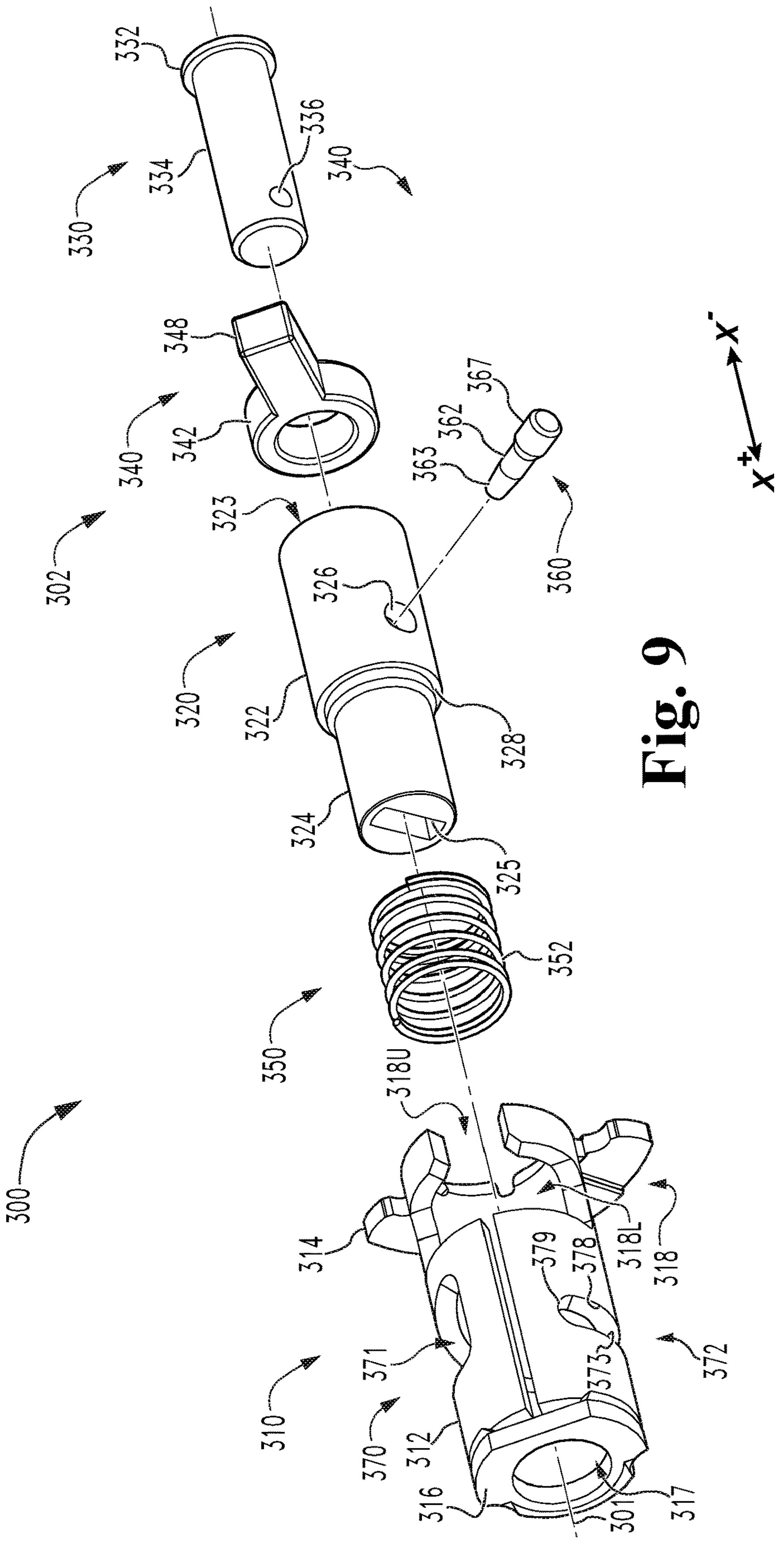
FIG. 9 is a second exploded assembly view of the keycam assembly illustrated in FIG. 8.

With additional reference to FIGS. 8 and 9, the keycam assembly 300 extends along a longitudinal axis 301 coincident with the longitudinal axis 101 of the lockset 100, and generally includes a keycam shell 310, a keycam plug 320 rotatably mounted in the keycam shell 310, a stem 330 mounted in the keycam plug 320, a lock control lug 340 captured between the keycam plug 320 and the stem 330, and a spring 350 seated in the keycam shell 310 and engaged with the keycam plug 320. The keycam assembly 300 further includes a cam pin 360, which couples the plug 320 with the stem 330 to define a cam follower 302 including the plug 320, the stem 330, and the cam pin 360. The keycam assembly 300 has a locking state and an unlocking state, and is configured to transition between the locking state and the unlocking state in response to rotation of the lock cylinder plug 144 between a home position and a first rotated position. As described herein, the cam follower 302 is one example of a movable component that is engaged with the lock cylinder plug 144 without lost motion such that the cam follower 302 moves between a locking position and an unlocking position in response to rotation of the lock cylinder plug 144 between its home position and its first rotated position.

The keycam shell 310 generally includes a tubular body portion 312, an ear 314 formed at a distal end of the body portion 312, an end wall 316 formed at a proximal end of the body portion 312, a T-shaped lock/unlock aperture 318 formed in the body portion 312, and a cam aperture 370 formed in the body portion 312. The tubular body portion 312 is rotatably mounted within the outside drive tube 230, and is selectively rotatable relative to the drive tube 230 as described herein. The ear 314 is engaged with the outside face 222 of the shuttle 220 such that rotation of the shell 310 in either direction causes a corresponding edge of the ear 314 to engage a corresponding one of the ramps 223 to drive the shuttle 220 toward its retracting position. Thus, rotation of the shell 310 from its home position in either direction causes actuation of the latchbolt mechanism 130 and retraction of the latchbolt 134. The proximal end wall 316 includes an aperture 317 through which the tailpiece 146 and/or the keycam plug 320 extend for engagement with one another. The lock/unlock aperture 318 includes a longitudinally-extending unlocking slot 318U and a circumferentially-extending locking slot 318L. As described herein, the lug 340 extends through the lock/unlock aperture 318 and the slot 238 of the outside drive tube 230, and the longitudinal locking/unlocking position of the lug 340 defines the locking/unlocking state of the keycam assembly 300, and thus the locked/unlocked state of the chassis 200 and the lockset 100.

The keycam plug 320 is rotatably mounted in the keycam shell 310, and includes a generally tubular plug body 322, a post 324 extending proximally from the body 322, and a pin aperture 326 formed in the plug body 322. The plug body 322 is of a larger diameter than the post 324 such that a shoulder 328 is formed at the transitional region between the body 322 and the post 324. The body 322 defines a chamber 323 in which the stem 330 is received. The distal end of the post 324 is operable to extend through the aperture 317, and defines an opening 325 into which the tailpiece 146 extends for rotational coupling of the tailpiece 146 with the post 324 such that rotation of the lock cylinder plug 144 causes a corresponding rotation of the keycam plug 320. In the illustrated form, the opening 325 is provided as a substantially rectangular opening that closely receives the tailpiece 146 to rotationally couple the plug 320 with the tailpiece 146. It is also contemplated that the opening 325 may have another configuration operable to slidably engage the tailpiece 146 while rotationally coupling with the tailpiece 146.

In the illustrated form, the opening 325 and the pin aperture 326 are oriented substantially orthogonal to one another. More particularly, a plane extending along the longitudinal axis 301 and the central axis of the pin aperture 326 is oriented perpendicular to a plane extending along the longitudinal axis 301 and the long axis of the cross-section of the opening 325. It is also contemplated that the opening 325 and the pin aperture 326 may have a different relative orientation, for example as described below with reference to the keycam assembly 500 illustrated in FIGS. 13-16.

The stem 330 is mounted in the keycam plug 320, and includes a distal cap 332 and a post 334 extending proximally from the cap 332. The post 334 is received in the chamber 323 defined by the plug body 322, and defines a pin aperture 336 aligned with the pin aperture 326 of the plug 320. In the illustrated form, the cam pin 360 extends into the aligned apertures 326, 336, thereby longitudinally and rotationally coupling the plug 320 and the stem 330 and providing the cam follower 302 as a unit in which the plug 320, the stem 330, and the cam pin 360 move with one another.

The illustrated lock control lug 340 includes a generally annular portion 342 and an arm 348 extending radially outward from the annular portion 342, and is movable between a proximal locking position and a distal unlocking position. The post 334 of the stem 333 extends through the annular portion 342 such that the lug 340 is captured between the cap 332 and the distal end of the plug 320. As a result, the lug 340 is rotatable relative to the cam follower 302, while the longitudinal position of the lug 340 varies according to the longitudinal position of the cam follower 302. In the illustrated form, the lug 340 is rotationally decoupled from the cam follower 302. It is also contemplated that the stem 330 and the lug 340 may include features that define a one-way rotational coupling between the cam follower 302 and the lug 340, for example as described below with reference to the keycam assembly 400 illustrated in FIG. 12. The arm 348 extends radially outward from the annular portion 342, through the lock/unlock aperture 318 and the slot 238 of the outside drive tube 230, and into the recess 218 defined by the outside hub 212. As described herein, the lug 340 selectively rotationally couples the outside drive tube 230 with the keycam shell 310 such that the longitudinal locking/unlocking position of the lug 340 corresponds to the locked/unlocked state of the lockset 100.

The illustrated spring 350 is provided in the form of a compression spring 352. The compression spring 352 is seated on the post 324 of the plug 320 and is captured between the proximal end wall 316 of the shell 310 and the shoulder 328 of the plug 320 such that the spring 350 distally biases the cam follower 302 toward its unlocking position. It is also contemplated that the spring 350 may be provided as another form of biasing member that biases the cam follower 302 in the distal direction, such as a form including one or more of an extension spring, an elastic member, a torsion spring, a leaf spring, and/or magnets.

The cam pin 360 defines an engagement portion of the cam follower 302, and generally includes a body portion 362, a tip portion 363 extending radially inward from the body portion 362, and a head portion 367 positioned radially outward of the body portion 362. The body portion 362 is received in the pin aperture 326 of the plug 320, the tip portion 363 is received in the pin aperture 336 of the stem 330, and the head portion 367 extends into the cam aperture 370 defined by the shell 310. In the illustrated form, the cam pin 360 rotationally and longitudinally couples the plug 320 with the stem 330 to define the cam follower 302 as a unit in which all components of the cam follower 302 move with one another.

The cam aperture 370 generally includes a wedge portion 371 and a circumferentially-extending slot 372 extending from the wedge portion 371. The wedge portion 371 is defined at least in part by a circumferentially-extending proximal edge 373, a helical distal edge 374, and a longitudinal edge 375 extending between and connecting the proximal edge 373 and the helical distal edge 374. The longitudinal edge 375 meets the helical edge 374 at a first corner defining an unlock landing 376, and meets the proximal edge 373 at a second corner 377. The circumferentially-extending slot 372 is defined in part by the proximal edge 373, and is further defined by a circumferentially-extending distal edge 378 adjacent the helical edge 374. An end edge 379 connects the proximal edge 373 and the circumferentially-extending distal edge 378, and defines an end of the slot 372 as an additional landing. As described herein, the pin 360 is configured to travel along the various edges of the cam aperture 370 to move the cam follower 302 and the lug 340 in response to rotation of the tailpiece 146 by the lock cylinder plug 144.

Figure 10:
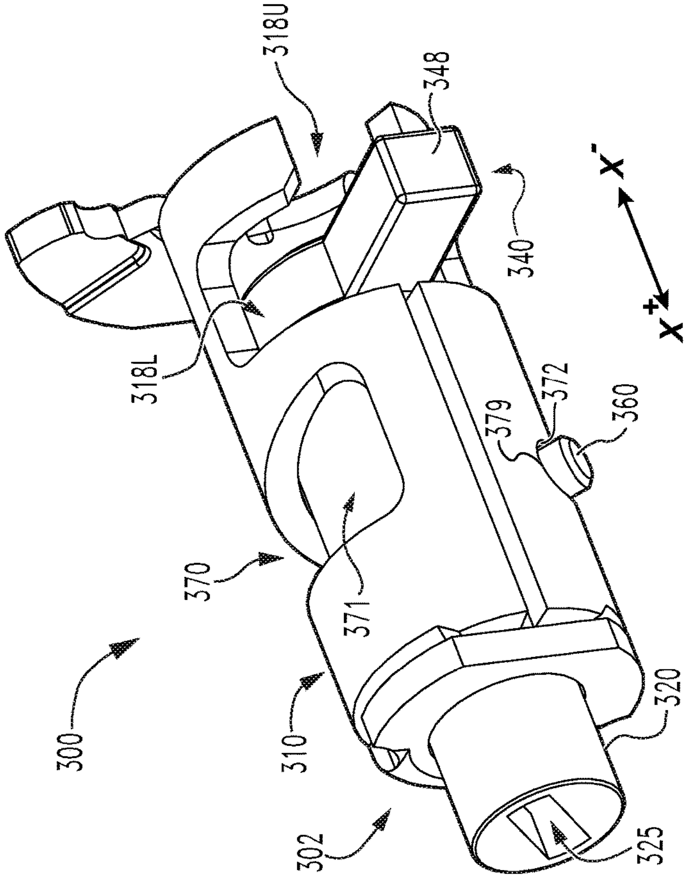
FIG. 10 is a perspective view of the keycam assembly illustrated in FIGS. 8 and 9 while in a locking state.

With additional reference to FIG. 10, illustrated therein is the keycam assembly 300 in its locking state. In this state, the cam follower 302 is in its lock-setting position, in which the pin 360 is received in the circumferentially-extending slot 372. Additionally, the lock control lug 340 is in its locking position, in which the arm 348 extends through the locking slot 318L and the outside drive tube slot 238 and into the locking section 218L defined by the outside hub 212. In this position, the lock control lug 340 rotationally couples the outside drive tube 230 (and thus the outside handle 116) with the housing 210, thereby preventing the outside handle 116 from rotating the keycam shell 310 for actuation of the chassis 200 and latchbolt mechanism 130. However, as a result of the configuration of the locking slot 318L, the shell 310 remains rotatable relative to the housing 210. In certain embodiments, this may facilitate a more direct actuation of the latchbolt mechanism 130 by the key 149 as described herein.

Figure 11:
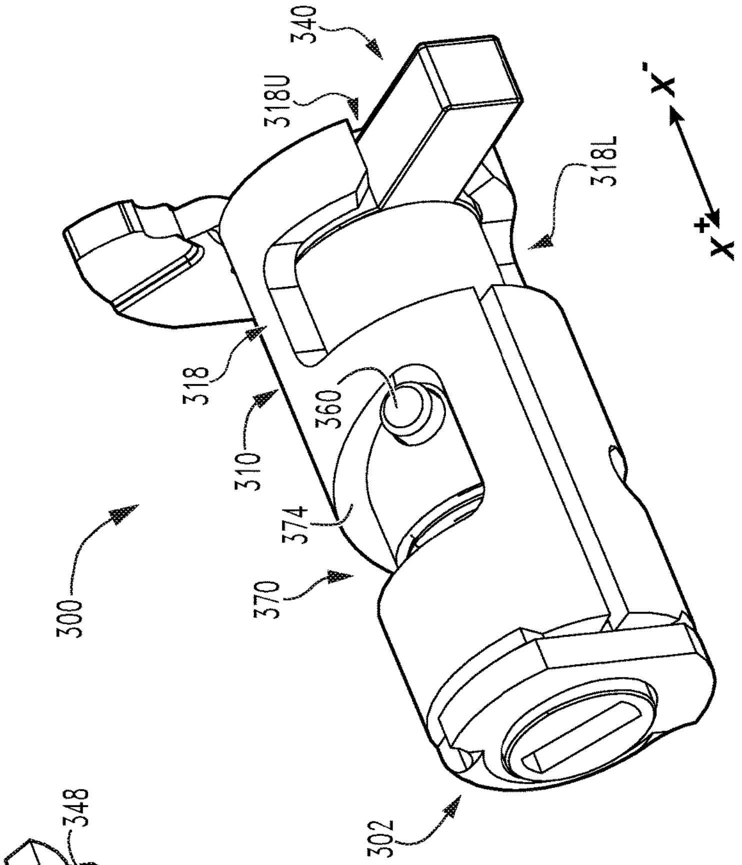
FIG. 11 is a perspective view of the keycam assembly illustrated in FIGS. 8 and 9 while in an unlocking state.

With additional reference to FIG. 11, illustrated therein is the keycam assembly 300 in its unlocking state. In this state, the cam follower 302 is in its unlock-setting position, in which the pin 360 is received at the unlock landing 376. Additionally, the lock control lug 340 is in its unlocking position, in which the arm 348 extends through the unlocking slot 318U and the outside drive tube slot 238 and into the unlocking section 218U of the recess 218. In this position, the lock control lug 340 rotationally couples the outside drive tube 230 (and thus the outside handle 116) with the keycam shell 310, thereby enabling the outside handle 116 to rotate the shell 310 for actuation of the chassis 200 and latchbolt mechanism 130. Additionally, the opposite ends of the arcuate unlocking section 218U limit the rotational range of the lug 340, thereby limiting the rotational range of the shell 310, the outside drive tube 230, and the outside handle 116. It is also contemplated that the rotational range of the handle 116 may be limited in another manner, such as via stops or other range-limiting features typical of locksets.

The keycam assembly 300 is configured to transition from its locking state (FIG. 10) to its unlocking state (FIG. 11) in response to a first rotation of the lock cylinder plug 144 in a first rotational direction from its home position to its first rotated position. More particularly, such a first rotation of the lock cylinder plug 144 causes a corresponding rotation of the cam follower 302 (clockwise in FIG. 10) such that the pin 360 exits the circumferentially-extending slot 372 and enters the wedge portion 371. Due to the fact that the lock cylinder plug 144 is rotationally coupled with the keycam plug 320 by the tailpiece 146, the first rotation of the lock cylinder plug 144 causes the corresponding rotation of the cam follower 302 without lost rotational motion. As the cam pin 360 enters the wedge portion 371, the spring 350 urges the pin 360 into contact with the helical edge 374, which permits the cam follower 302 and the lock control lug 340 to move distally under the distal biasing force of the spring 350 as the lock cylinder plug 144 continues to rotate toward the first rotated position. Thus, when the lock cylinder plug 144 reaches its first rotated position, the cam follower 302 adopts its unlock-setting position, the lock control lug 340 is in its unlocking position, and the keycam assembly 300 is in its unlocking state, thereby setting the chassis 200 to its unlocking state and unlocking the lockset 100.

The keycam assembly 300 is configured to transition from its unlocking state (FIG. 11) to its locking state (FIG. 10) in response to a second rotation of the lock cylinder plug 144 that is equal and opposite the first rotation, and which is defined by rotation of the plug 144 in a second rotational direction from its first rotated position to its home position. More particularly, such a second rotation of the lock cylinder plug 144 causes a corresponding rotation of the cam follower 302 (counter-clockwise in FIG. 11) such that the helical edge 374 drives the cam follower 302 proximally against the biasing force of the spring 350. When the cam follower 302 reaches its lock-setting position, the lock control lug 340 is in its locking position, and the keycam assembly 300 is in its locking state, thereby setting the chassis 200 to its locking state and locking the lockset 100. Due to the fact that the lock cylinder plug 144 is rotationally coupled with the keycam plug 320 by the tailpiece 146, the second rotation of the lock cylinder plug 144 causes the corresponding rotation of the cam follower 302 without lost rotational motion. Thus, the plug 144 need not travel beyond its home position in the second rotational direction and return to the home position in the first rotational direction in order to return the keycam assembly 300 to its locking state.

As should be evident from the foregoing, the illustrated chassis 200 transitions from its locked state to its unlocked state in response to a first rotation of the lock cylinder plug 144, and transitions from its unlocked state to its locked state in response to a second rotation of the lock cylinder plug 144. The first rotation of the plug 144 is a rotation in a first rotational direction from a home position to a first rotated position, and the second rotation of the plug 144 is a rotation in a second rotational direction from the first rotated position to the home position. Thus, the chassis 200 transitions between its locked state and its unlocked state in response to equal and opposite rotations of the plug 144 between a home position and a rotated position. This is a result of the rotational coupling between the plug 144 and the cam follower 302, and is in contrast to certain conventional locksets, which typically provide for lost rotational motion between the lock cylinder plug and the key cam plug, for example by providing the keycam plug with a bowtie opening that receives a flat tailpiece. In such conventional locksets, rotation of the lock cylinder plug from its home position unlocks the lockset, but return of the lock cylinder plug to its home position does not re-lock the lockset. Instead, the lost rotational motion connection permits the lockset to remain in the unlocked state when the lock cylinder plug is returned to its home position to permit for extraction of the key such that the lockset is capable of remaining unlocked when the key is not inserted into the plug.

In contrast to the conventional locksets described in the preceding paragraph, the current lockset 100 is unlocked only when the lock cylinder plug 144 is in its first rotated position, and return of the lock cylinder plug 144 to its home position causes the lockset 100 to return to the locked state as described above. Because the lock cylinder 140 prevents extraction of the key 149 when the plug 144 is not in its home position, the lockset 100 is only unlocked when the key 149 is inserted and rotated to drive the plug 144 to its first rotated position. Additionally, the lockset 100 automatically returns from the unlocked state to the locked state upon return of the plug 144 to its home position for extraction of the key 149.

In the illustrated form, the lockset 100 is further configured to actuate the latchbolt mechanism 130 in response to a third rotation of the lock cylinder plug 144, wherein the third rotation is a rotation in the second direction from the home position to a second rotated position. As noted above, when the lockset 100 is in its locked state, the cam pin 360 is seated in the circumferentially-extending slot 372. Thus, the third rotation of the lock cylinder plug 144 causes a corresponding rotation of the cam follower 302 (counter-clockwise in FIG. 10). As the cam follower 302 rotates with the lock cylinder plug 144, the pin 360 engages the end edge 379 of the circumferentially-extending slot 372 and drives the keycam shell 310 to rotate with the cam follower 302, thereby retracting the shuttle 220 and the latchbolt 134. Due to the fact that the lug 340 is received in the locking slot 318L, the shell 310 is rotationally decoupled from the outside drive tube 230 as described above. The third rotation of the lock cylinder plug 144 thus retracts the latchbolt 134 without causing rotation of the handle 116. As such, the user need not overcome the rotational biasing force of the rotational bias mechanism 113, which facilitates retraction of the latchbolt 134 by the key 149.

Figure 12:
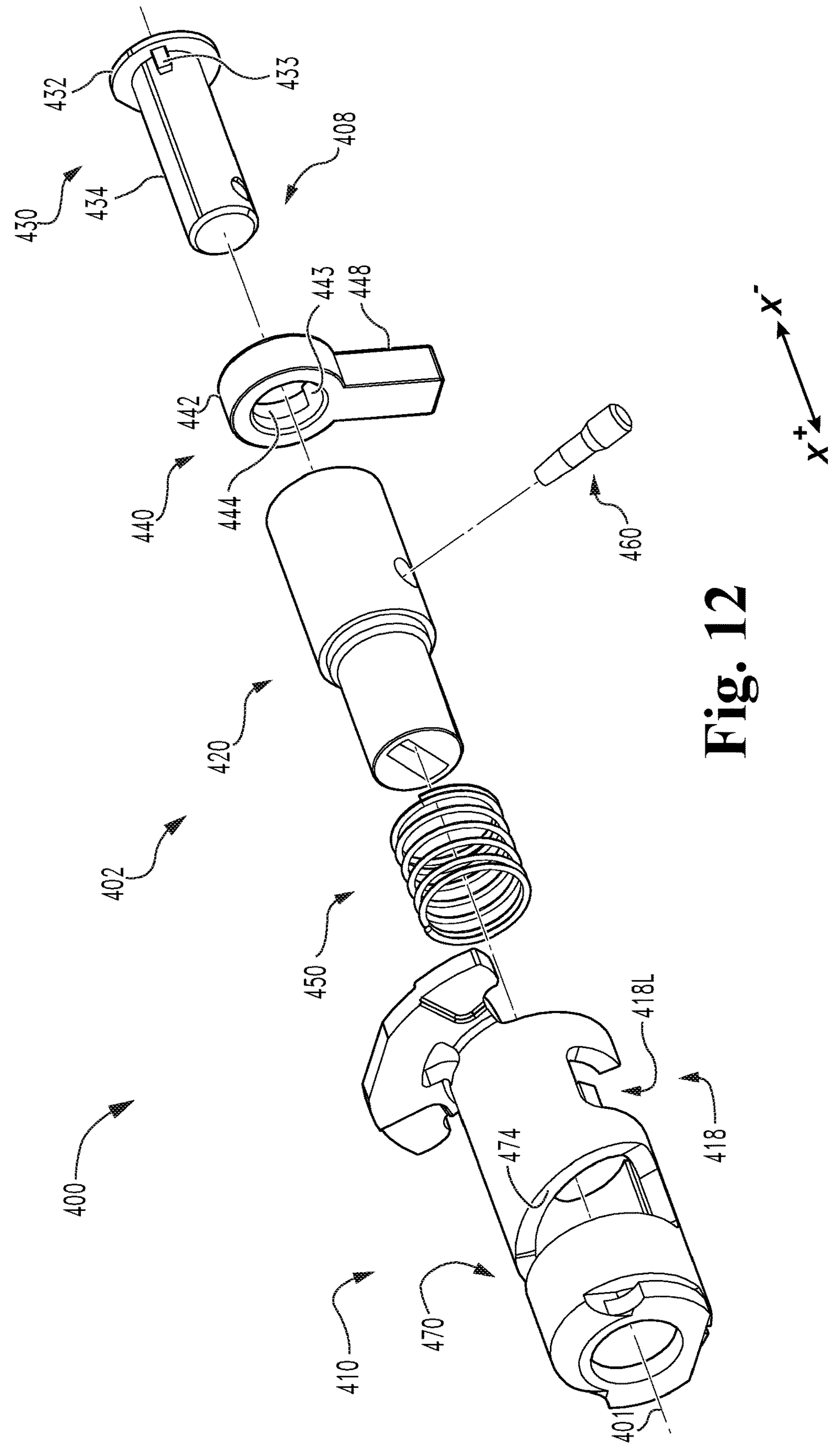
FIG. 12 is an exploded assembly view of a keycam assembly according to certain embodiments.

With additional reference to FIG. 12, illustrated therein is a keycam assembly 400 according to certain embodiments. The keycam assembly 400 is substantially similar to the keycam assembly 300 described above, and similar reference characters are used to indicate similar elements and features. For example, the keycam assembly 400 extends along a longitudinal axis 401 and generally includes a shell 410, a plug 420, a stem 430, a lock control lug 440, a spring 450, a pin 460, and a cam aperture 470, which respectively correspond to the above-described longitudinal axis 301, shell 310, plug 320, stem 330, lock control lug 340, spring 350, pin 360, and cam aperture 370. In the interest of conciseness, the following description of the keycam assembly 400 focuses primarily on features that are different from those described above with regard to the above-described keycam assembly 300.

In the illustrated form, the stem 430 includes a stem spline 433 extending distally from the cap 432 along one side of the stem post 434. Additionally, the lock control lug 440 has an arcuate recess 444 formed on the radially-inner side of the annular portion 442. The arcuate recess 444 is defined along the inner circumference of the annular portion 442, and is interrupted by a lug spline 443. The stem spline 433 is received in the arcuate recess 444 and is operable to engage the lug spline 443 such that a one-way rotational coupling 408 is defined between the cam follower 402 and the lug 440. The one-way rotational coupling 408 is configured to prevent relative rotation of the cam follower 402 and the lug 440 in one rotational direction while permitting relative rotation of the cam follower 402 and the lug 440 in the opposite rotational direction.

When the keycam assembly 400 is in a locking state analogous to that illustrated in FIG. 10, the arm 448 of the lug 440 extends through the locking section 418L of the lock/unlock aperture 418 such that the shell 410 is rotationally decoupled from the outside drive tube 230 and the outside handle 116. In this state, the first rotation of the lock cylinder plug 144 (i.e., the rotation in the first rotational direction 192 from the home position to the first rotated position) transitions the keycam assembly 400 to its unlocking state, and the second rotation of the lock cylinder plug 144 (i.e., the rotation in the second rotational direction 194 from the first rotated position to the home position) transitions the keycam assembly 400 to its locking state as described above. With the keycam assembly 400 installed to the lockset 100, however, the third rotation of the lock cylinder plug 144 (i.e., the rotation in the second rotational direction 194 from the home position to the second rotated position) is prevented. More particularly, should the user attempt to rotate the key 149 in the second rotational direction while the plug 144 is in its home position, the splines 433, 443 of the one-way rotational coupling 408 will engage one another and urge the lock control lug 440 to rotate in a corresponding direction. However, such rotation of the lock control lug 440 is prevented due to the engagement of the arm 448 with the locking section 218L of the lock/unlock recess 218 defined by the outside hub 212. As a result, the keycam assembly 400 prevents rotation of the lock cylinder plug 144 from the home position in the second rotational direction.

Figure 13:
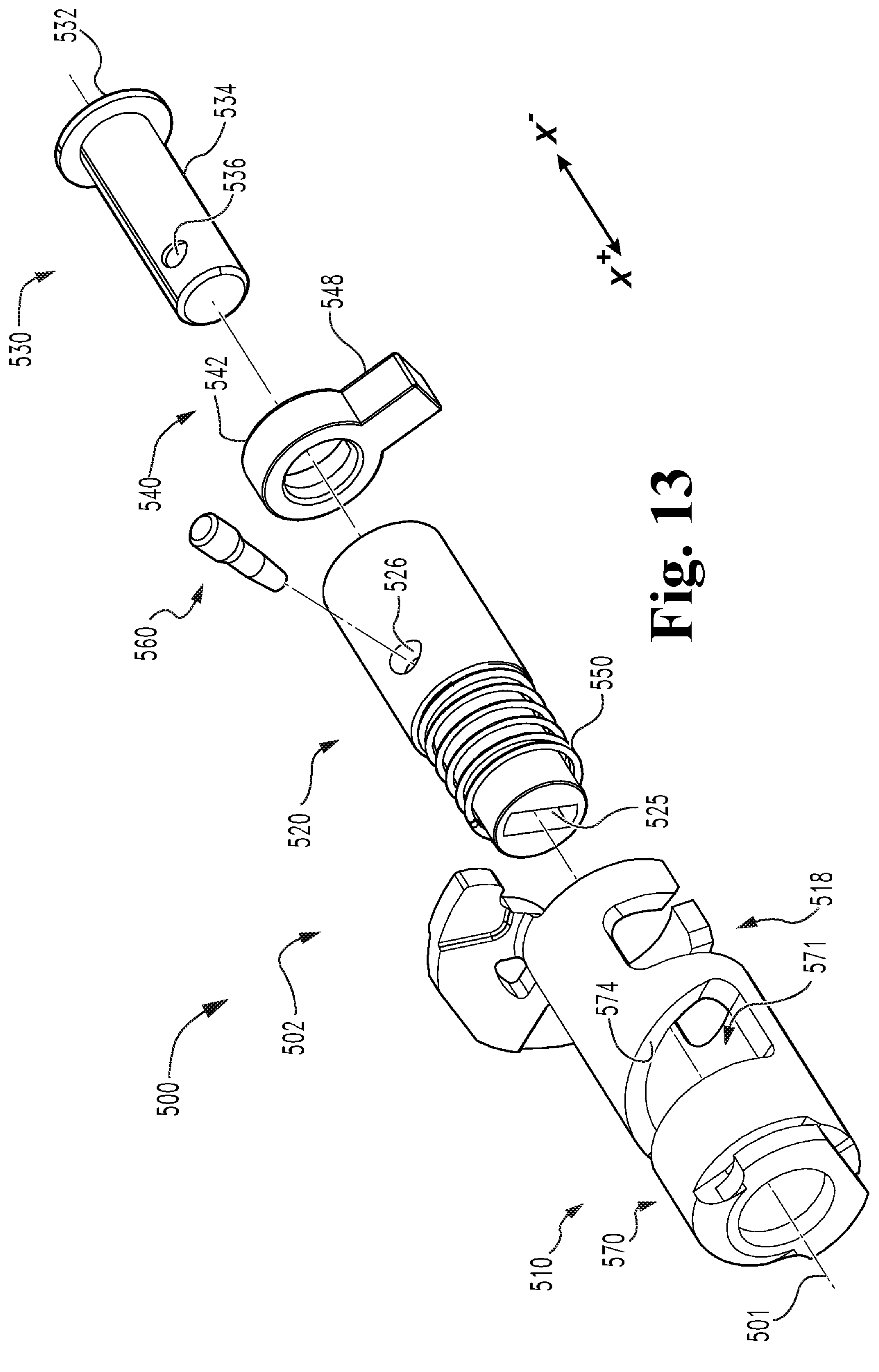
FIG. 13 is an exploded assembly view of a keycam assembly according to certain embodiments.

With additional reference to FIG. 13, illustrated therein is a keycam assembly 500 according to certain embodiments. The keycam assembly 500 is substantially similar to the keycam assembly 300 described above, and similar reference characters are used to indicate similar elements and features. For example, the keycam assembly 500 extends along a longitudinal axis 501 and generally includes a shell 510, a plug 520, a stem 530, a lock control lug 540, a spring 550, a pin 560, and a cam aperture 570, which respectively correspond to the above-described longitudinal axis 301, shell 310, plug 320, stem 330, lock control lug 340, spring 350, pin 360, and cam aperture 370. In the interest of conciseness, the following description of the keycam assembly 500 focuses primarily on features that are different from those described above with regard to the above-described keycam assembly 300.

In the illustrated form, the arm 548 of the lock control lug 540 is shorter than the arm 348 of the above-described lock control lug 340. More particularly, the length of the arm 548 is sufficient for the arm 548 to extend through the lock/unlock opening 518 and into the outside drive tube slot 238, but is short enough that the arm 548 does not extend into the locking section 218L of the lock/unlock recess 218 defined by the outside hub 212 when the lug 540 is in its locking position. As a result, when the keycam assembly 500 is in its locking state, the outside handle 116 remains free to rotate through its normal limited range of motion. As described herein, however, such rotation of the handle 116 is not transmitted to the shell 510 in a manner that would retract the shuttle 220 or drive the keycam assembly 500 to its unlocking state.

Another difference between the above-described keycam assembly 300 and the keycam assembly 500 relates to the relative orientations of the tailpiece-receiving opening 525 and the pin aperture 526. In the above-described keycam assembly 300, the opening 325 and the pin aperture 326 are oriented substantially orthogonal to one another as described above. In the illustrated plug 520, however, the tailpiece-receiving opening 525 and the pin aperture 526 are oriented obliquely relative to one another. More particularly, a plane extending along the longitudinal axis 501 and the central axis of the pin aperture 526 defines an oblique angle relative to a plane extending along the longitudinal axis 501 and the long axis of the cross-section of the opening 525. While other angles are contemplated, in the illustrated form the oblique angle defined by these planes is about 60°.

While the illustrated form of the keycam assembly 500 does not include one-way rotational coupling, it is also contemplated that the keycam assembly 500 may be provided with a one-way rotational coupling along the lines of the one-way rotational coupling 408. Such a one-way rotational coupling may prevent rotation of the plug 144 from its home position in the second direction as described above with reference to the keycam assembly 400.

Figure 14:
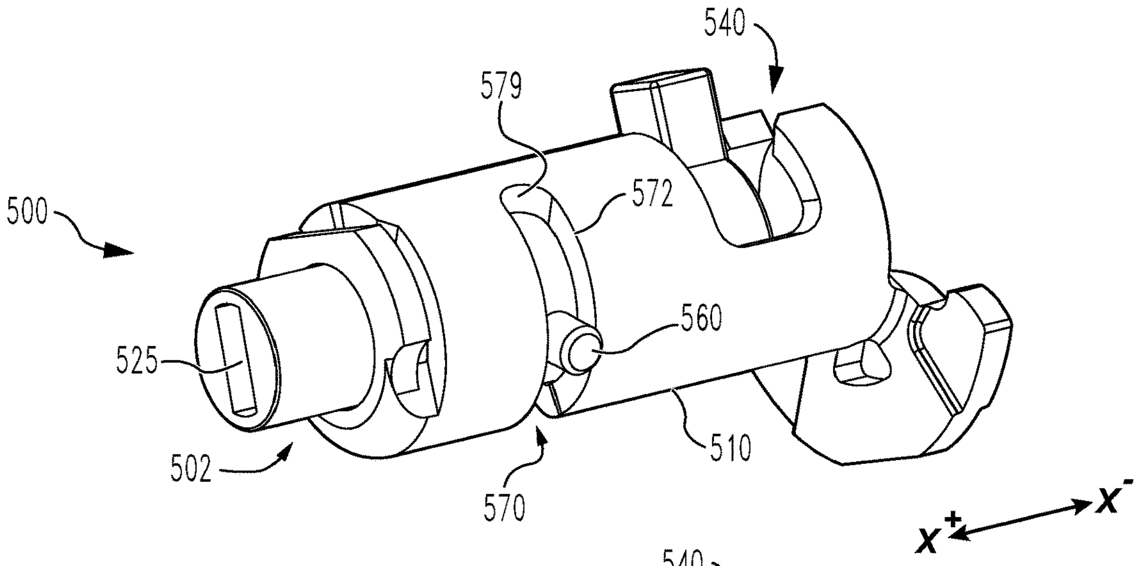
FIGS. 14-16 illustrate the keycam assembly illustrated in FIG. 13 in various locking states corresponding to different handle positions.
Figure 15:
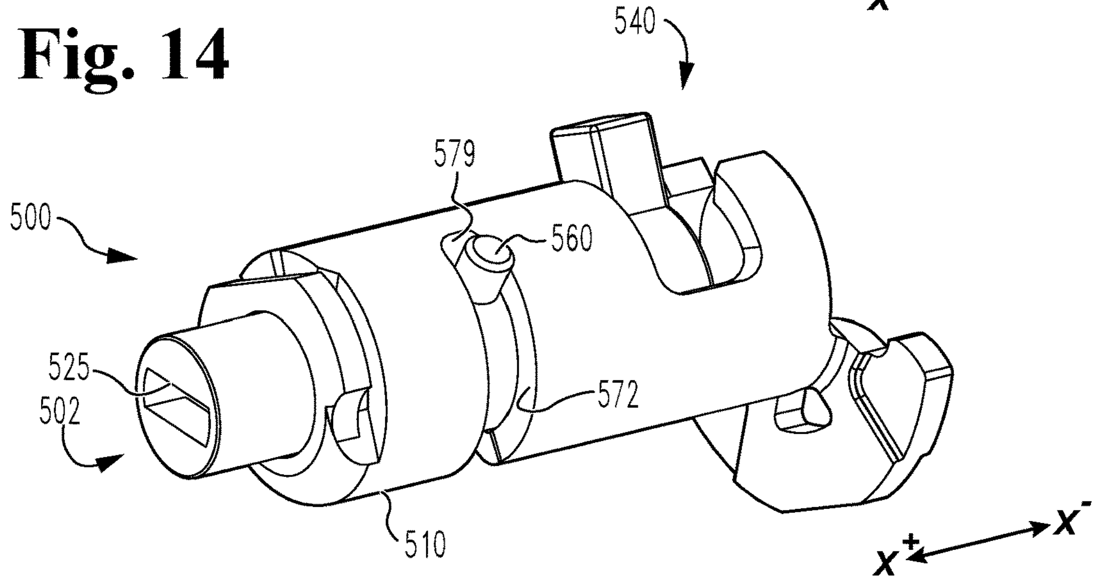
Figure 16:
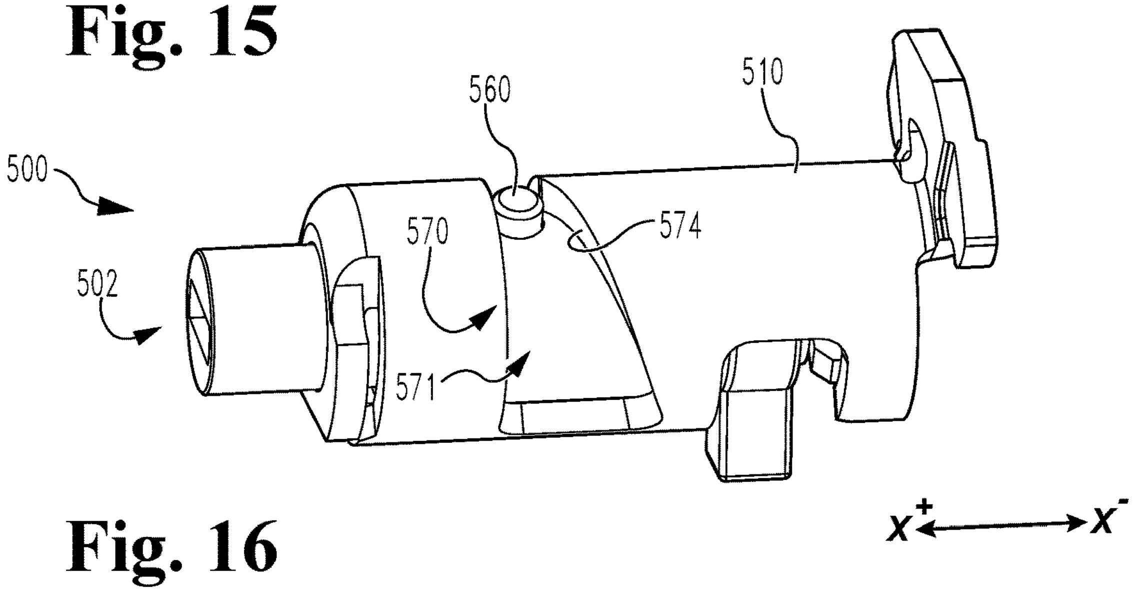

With additional reference to FIGS. 14-16, the obliquely-offset nature of the tailpiece-receiving opening 525 and the pin aperture 526 aid in permitting the normal limited rotation of the handle 116 without causing a corresponding actuation of the chassis 200 for retraction of the latchbolt 134. As will be appreciated, such rotation of the handle 116 causes a corresponding rotation of the tailpiece 146, and thus of the cam follower 502. As described herein, however, such rotation is insufficient to transition the keycam assembly 500 to its unlocking state and/or rotate the shell 510 for retraction of the shuttle 220.

FIG. 14 illustrates the keycam assembly 500 in its normal locking state, which occurs when the handle 116 is in its home position. In this state, the lock control lug 540 is in its locking position, and the cam pin 560 is positioned about midway along the circumferential extent of the circumferentially-extending slot 572 of the cam aperture 570.

FIG. 15 illustrates the keycam assembly 500 in a second locking state, which occurs when the outside handle 116 has been rotated in a first direction (e.g., counter-clockwise) to the end of its permitted travel in the first direction. This rotation of the handle 116 causes a corresponding rotation of the cam follower 502 relative to the shell 510 such that the cam pin 560 travels along the circumferentially-extending slot 572 toward the end edge 579 of the slot 572. As will be appreciated, further rotation of the handle 116 when the pin 560 is adjacent the end edge 579 would cause rotation of the shell 510 for retraction of the shuttle 220. However, the circumferential extent of the slot 572 may be sufficiently great that if the pin 560 engages the end edge 579, such engagement occurs only as the handle 116 reaches the end of its normal limited range of rotation in the first direction. As a result, the handle 116 is prevented from rotating the cam follower 502 by a degree sufficient to rotate the shell 510 for retraction of the shuttle 220 and actuation of the latchbolt mechanism 130.

FIG. 16 illustrates the keycam assembly 500 in a third locking state, which occurs when the handle 116 has been rotated in a second direction (e.g., clockwise) to the end of its permitted travel in the second direction. This rotation of the handle 116 causes a corresponding rotation of the cam follower 502 such that the cam pin 560 travels along the circumferentially-extending slot 572 toward the wedge portion 571. However, the circumferential extent of the slot 572 may be sufficiently great that if the pin 560 enters the wedge portion 571, it does so only as the handle reaches the end of its normal limited range of rotation in the second direction. As a result, the handle 116 is prevented from rotating the cam follower 502 by a degree sufficient to permit movement of the cam follower 502 to its unlock-setting position. Thus, the lock control lug 540 remains in its locking position, and the keycam assembly 500 remains in its locking state even when the handle 116 is rotated to the end of its limited range of travel in the second direction.

Figure 17:
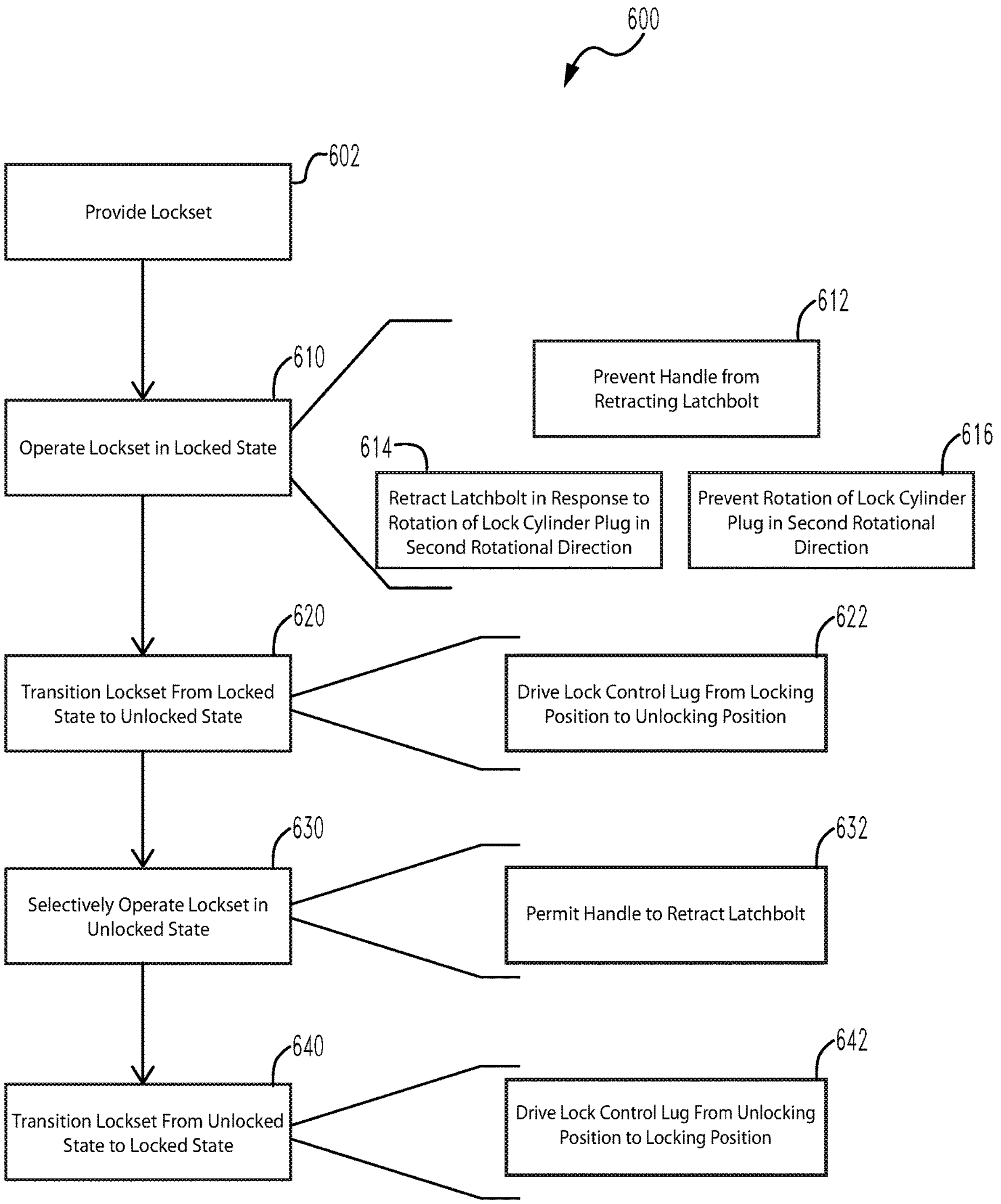
FIG. 17 is a schematic flow diagram of a process according to certain embodiments.

With additional reference to FIG. 17, an exemplary process 600 that may be performed using the lockset 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 600 is described herein with specific reference to the lockset 100 illustrated in FIGS. 1-11, it is to be appreciated that the process 600 may be performed with locksets having additional or alternative features. For example, certain blocks of the process 600 may be performed using an embodiment of the lockset 100 that includes one of the keycam assemblies 400, 500 in place of the keycam assembly 300. As another example, the lockset utilized in the process 600 may not necessarily be a cylindrical lockset such as that illustrated in FIGS. 1-11, but may instead be of a different format, such as mortise or tubular.

The process 600 may begin with block 602, which involves providing a lockset including a first handle, a latchbolt, and a lock cylinder including a plug operable to rotate in a first rotational direction from a home position to a first rotated position and to rotate in a second rotational direction from the first rotated position to the home position. Block 602 may, for example, involve providing the lockset 100, which includes a first handle 116, a latchbolt 134, and a lock cylinder 140. As noted above, the lock cylinder 140 includes a plug 144 operable to rotate in a first rotational direction from a home position to a first rotated position and to rotate in a second rotational direction from the first rotated position to the home position. In certain embodiments, the lockset provided in block 602 may include a second handle that is at all times operable to retract the latchbolt. For example, the lockset 100 may include the inside handle 126, which is at all times capable of actuating the chassis 200 for retraction of the latchbolt 134 as described above.

In certain embodiments, the lockset provided in block 602 may further comprise a chassis connected with the handle and the latchbolt, and the chassis may include a keycam assembly comprising a keycam shell, a lock control lug, a cam follower, and a spring. For example, block 602 may involve providing the chassis 200, which is connected with the handle 116 and the latchbolt 134 and includes a keycam assembly. In certain embodiments, the keycam assembly may be provided as the keycam assembly 300, which generally includes a keycam shell 310, a lock control lug 340, a cam follower 302, and a spring 350. In certain embodiments, the keycam assembly may be provided as the keycam assembly 400, which generally includes a keycam shell 410, a lock control lug 440, a cam follower 402, and a spring 450. In certain embodiments, the keycam assembly may be provided as the keycam assembly 500, which generally includes a keycam shell 510, a lock control lug 540, a cam follower 502, and a spring 550. It is also contemplated that other configurations of chassis and keycam assemblies may be utilized in the lockset provided in block 602.

The process 600 includes block 610, which generally involves selectively operating the lockset in a locked state. For example, block 610 may involve selectively operating the lockset 100 in its locked state, in which the chassis 200 is in its locked state, the keycam 300/400/500 is in its locking state, and the lock control lug 340/440/540 is in its locking position.

Block 610 may include block 612, which generally involves preventing the handle from retracting the latchbolt. In certain forms, block 612 may involve preventing the handle 116 from retracting the latchbolt 134 by preventing rotation of the handle 116. For example, in embodiments in which the keycam assembly is provided along the lines of the keycam assembly 300 or the keycam assembly 400, block 612 may involve rotationally coupling the handle 116 with the chassis 200 by causing the lock control lug 340/440 to lock the outside drive tube 230 to the outside hub 212. It is also contemplated that block 612 may involve preventing the handle 116 from retracting the latchbolt 134 by permitting limited free rotation of the handle 116. For example, in embodiments in which the keycam assembly is provided along the lines of the keycam assembly 500, such rotation of the handle 116 neither rotates the keycam shell 510 nor transitions the keycam assembly 500 to its unlocking state, as described above with reference to FIGS. 14-16.

In certain embodiments, block 610 may include block 614, which generally involves retracting the latchbolt in response to rotation of the lock cylinder plug in the second rotational direction from the home position to a second rotated position. For example, in embodiments in which the keycam assembly is provided along the lines of the keycam assembly 300 or the keycam assembly 500, rotation of the lock cylinder plug 144 from its home position to its second rotated position may retract the latchbolt 134 as described above. As noted above, the handle 116 may remain stationary during retraction of the latchbolt 134 by the key 149, thereby reducing the torque required to actuate the chassis 200 and the latchbolt mechanism 130.

In certain embodiments, block 610 may include block 616 as an alternative to block 614. Block 616 generally involves preventing rotation of the lock cylinder plug from the home position in the second rotational direction. For example, in embodiments in which the keycam assembly of the lockset is provided along the lines of the keycam assembly 400, rotation of the lock cylinder plug 144 in the second rotational direction from its home position may be prevented by the one-way rotational coupling 408 as described above.

The process 600 further includes block 620, which generally involves transitioning the lockset from the locked state to the unlocked state in response to rotation of a plug of the lock cylinder in a first rotational direction from a home position to a first rotated position. For example, block 620 may involve transitioning the lockset 100 from its locked state to its unlocked state in response to rotation of the plug 144 of the lock cylinder 140 in the first rotational direction 192 from its home position (FIG. 4) to its first rotated position (FIG. 6) as described above.

In certain embodiments, block 620 may include block 622, which generally includes causing a spring of the keycam assembly to urge the lock control lug from the locking position to the unlocking position in response to rotation of the plug from the home position to the first rotated position in the first rotational direction. For example, block 622 may involve causing the spring 350/450/550 to urge the lock control lug 340/440/540 from its locking position to its unlocking position in response to the first rotation of the lock cylinder plug 144 as described above.

The process 600 further includes block 630, which generally involves selectively operating the lockset in an unlocked state. For example, block 630 may involve selectively operating the lockset 100 in its unlocked state, in which the chassis 200 is in its unlocked state, the keycam 300/400/500 is in its unlocking state, and the lock control lug 340/440/540 is in its unlocking position. In certain embodiments, block 630 may be performed only when the proper key 149 is inserted and the lock cylinder plug 144 has been rotated in the first rotational direction from its home position to its first rotated position.

Block 630 may include block 632, which generally involves permitting the handle to retract the latchbolt. For example, block 632 may involve causing the lock control lug 340/440/540 to rotationally couple the handle 116 with the keycam shell 310/410/510 such that the handle 116 is operable to retract the shuttle 220 for actuation of the chassis 200 and the latchbolt mechanism 130.

The process 600 further includes block 640, which generally involves transitioning the lockset from the unlocked state to the locked state in response to rotation of the plug from the first rotated position to the home position in a second rotational direction opposite the first rotational direction. For example, block 640 may involve transitioning the lockset 100 from the unlocked state to the locked state in response to rotation of the lock cylinder plug 144 from the first rotated position (FIG. 5) to the home position (FIG. 4) in the second rotational direction 194 as described above.

In certain embodiments, block 640 may include block 642, which generally involves causing an edge of the cam aperture to drive the cam follower against an urging of the spring to an unlock-setting position in response to rotation of the plug from the first rotated position to the home position in the second rotational direction, thereby driving the lock control lug from the unlocking position to the locking position. For example, block 642 may involve causing the helical edge 374/474/574 to drive the cam follower 302/402/502 against the urging of the spring 350/450/550 to its unlock-setting position in response to the second rotation of the lock cylinder plug 144, thereby driving the lock control lug 340/440/540 from its unlocking position to its locking position.

Although the illustrated lockset 100 is provided in the form of a cylindrical lockset, it is also contemplated that the teachings of the present application may apply to other forms of lockset assemblies, such as mortise locksets, tubular locksets, and escutcheon-based handle assemblies. For example, while traditional forms of such locksets typically include a lost motion connection between the lock cylinder plug and a movable component that sets the locked/unlocked state of the lockset, the present teachings may be applied to couple the lock cylinder plug and the movable component such that rotation of the lock cylinder plug between its home position and its first rotated position drives the movable component between its locking position and its unlocking position to thereby provide the lockset with a locked state only when the proper key is inserted and rotated to its first rotated position.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lockset, comprising:

a chassis configured for mounting to a door, the chassis having a locked state and an unlocked state;

a latchbolt connected with the chassis such that the chassis is operable to retract the latchbolt;

an outside handle rotatably coupled with the chassis, wherein the chassis in the unlocked state is configured to permit the outside handle to retract the latchbolt, and wherein the chassis in the locked state is configured to prevent the outside handle from retracting the latchbolt; and a lock cylinder operably connected with the chassis, the lock cylinder comprising a shell and a plug selectively rotatable relative to the shell;

wherein upon insertion of a proper key into the plug, the plug is operable to rotate in a first rotational direction from a home position to a first rotated position, and to rotate from the first rotated position to the home position in a second rotational direction opposite the first rotational direction;

wherein the chassis is configured to transition from the locked state to the unlocked state in response to rotation of the plug in the first rotational direction from the home position to the first rotated position;

wherein the chassis is configured to return from the unlocked state to the locked state in response to rotation of the plug in the second rotational direction from the first rotated position to the home position; and wherein the lock cylinder is configured to retain the key within the plug when the plug is in the first rotated position.

2. The lockset of claim 1, wherein the chassis is further configured to prevent rotation of the plug from the home position in the second rotational direction.

3. The lockset of claim 1, wherein the chassis is further configured to retract the latchbolt in response to rotation of the plug in the second rotational direction from the home position to a second rotated position.

4. The lockset of claim 3, wherein rotation of the plug in the second rotational direction from the home position to the second rotated position does not cause a corresponding rotation of the outside handle.

5. The lockset of claim 1, wherein the outside handle is configured to remain stationary during rotation of the plug from the home position in the first rotational direction.

6. The lockset of claim 1, wherein the chassis in the locked state is configured to prevent rotation of the outside handle.

7. The lockset of claim 1, wherein the chassis in the locked state is configured to permit rotation of the outside handle through a limited range without retracting the latchbolt in response to rotation of the outside handle.

8. The lockset of claim 1, wherein chassis further comprises a movable component, the movable having a locking position defining the locked state, the movable component having an unlocking position defining the unlocked state; and wherein the plug is engaged with the movable component without lost motion such that the movable component moves between the locking position and the unlocking position in response to rotation of the plug between the home position and the first rotated position.

9. A lockset, comprising:

a chassis configured for mounting to a door, the chassis comprising a movable component having a locking position defining a locked state of the chassis and an unlocking position defining an unlocked state of the chassis;

a latchbolt connected with the chassis such that actuation of the chassis drives the latchbolt from an extended position to a retracted position;

an outside handle rotatably coupled with the chassis, wherein the chassis in the unlocked state is operable to be actuated by the outside handle for retraction of the latchbolt, and wherein the chassis in the locked state is inoperable to be actuated by the outside handle for retraction of the latchbolt; and a lock cylinder operably connected with the chassis, the lock cylinder comprising a shell and a plug selectively rotatable relative to the shell upon insertion of a key;

wherein the plug is engaged with the movable component;

wherein a first rotation of the plug from a home position to a rotated position moves the movable component from the locking position to the unlocking position;

wherein a second rotation of the plug from the rotated position to the home position moves the movable component from the unlocking position to the locking position;

wherein the first rotation and the second rotation are equal and opposite rotations; and wherein the lock cylinder is configured to prevent removal of the key from the plug when the plug is not in the home position.

10. The lockset of claim 9, wherein the chassis comprises a keycam assembly, the keycam assembly comprising the movable component.

11. The lockset of claim 10, wherein the keycam assembly comprises:

a keycam shell defining a cam aperture and a lock/unlock aperture;

a cam follower movably mounted in the keycam shell and defining the movable component, wherein an engagement portion of the cam follower is received in the cam aperture;

a lock control lug longitudinally coupled with the cam follower, the lock control lug including an arm extending through the lock/unlock aperture; and a spring engaged with the cam follower;

wherein the cam aperture is configured to longitudinally drive the cam follower and the lock control lug from a locking position to an unlocking position in response to rotation of the plug in a first rotational direction from the home position to the first rotated position; and wherein the spring is configured to longitudinally drive the cam follower and the lock control lug from the locking position to the unlocking position in response to rotation of the plug in a second rotational direction from the first rotated position to the home position.

12. The lockset of claim 9, further comprising a tailpiece rotationally coupling the plug with the movable component;

wherein the tailpiece has a first cross-sectional geometry; and wherein the movable component comprises an opening having a second cross-sectional geometry corresponding to the first cross-sectional geometry such that the opening matingly receives the tailpiece.

13. The lockset of claim 9, wherein the handle is operable to remain stationary during each of the first rotation and the second rotation.

14. The lockset of claim 9, wherein the chassis is configured to retract the latchbolt in response to a third rotation of the plug.

15. The lockset of claim 14, wherein the handle is operable to remain stationary during retraction of the latchbolt in response to the third rotation of the plug.

16. A method of operating a lockset comprising a handle, a latchbolt, and a lock cylinder, the method comprising:

operating the lockset in a locked state, wherein the operating the lockset in the locked state comprises preventing the handle from retracting the latchbolt;

transitioning the lockset from the locked state to an unlocked state in response to insertion of a key into a plug of the lock cylinder and rotation of the plug in a first rotational direction from a home position to a first rotated position;

with the plug in the first rotated position, operating the lockset in the unlocked state, wherein operating the lockset in the unlocked state comprises permitting the handle to retract the latchbolt and preventing removal of the key from the plug; and transitioning the lockset from the unlocked state to the locked state in response to rotation of the plug in a second rotational direction from the first rotated position to the home position, wherein the second rotational direction is opposite the first rotational direction.

17. The method of claim 16, wherein operating the lockset in the locked state further comprises retracting the latchbolt in response to rotation of the plug in the second rotational direction from the home position to a second rotated position.

18. The method of claim 17, wherein the handle remains stationary during retraction of the latchbolt in response to rotation of the plug in the second rotational direction from the home position to the second rotated position.

19. The method of claim 16, wherein operating the lockset in the locked state further comprises preventing rotation of the plug from the home position in the second rotational direction.

20. The method of claim 16, wherein operating the lockset in the locked state further comprises preventing rotation of the handle.

21. The method of claim 16, wherein operating the lockset in the locked state further comprises permitting rotation of the handle through a limited rotational range without retracting the latchbolt in response to rotation of the handle.

22. The method of claim 16, wherein the lockset further comprises a chassis connected with the handle and the latchbolt;

wherein the chassis comprises a keycam assembly, the keycam assembly comprising:

a keycam shell defining a cam aperture, wherein rotation of the shell from a shell home position to a shell rotated position retracts the latchbolt;

a lock control lug movably mounted in the keycam shell, the lock control lug having an unlocking position in which the lock control lug permits rotation of the keycam shell by the handle, the lock control lug having a locking position in which the handle is inoperable to rotate the keycam shell;

a cam follower rotationally coupled with the plug and longitudinally coupled with the lock control lug, wherein a portion of the cam follower is received in the cam aperture; and a spring engaged with the cam follower;

wherein transitioning the lockset from the locked state to the unlocked state comprises causing the spring to urge the lock control lug from the locking position to the unlocking position in response to rotation of the plug from the home position to the first rotated position in the first rotational direction; and wherein transitioning the lockset from the unlocked state to the locked state comprises causing an edge of the cam aperture to drive the cam follower against an urging of the spring to an unlock-setting position in response to rotation of the plug from the first rotated position to the home position in the second rotational direction, thereby driving the lock control lug from the unlocking position to the locking position.

* * * * *